United States Patent
Wandura et al.

(10) Patent No.: US 12,296,517 B2
(45) Date of Patent: May 13, 2025

(54) METHOD FOR HANDLING INDIVIDUAL PARTS, HANDLING SYSTEMS, AND GROUPING UNIT

(71) Applicant: MA micro automation GmbH, St. Leon-Rot (DE)

(72) Inventors: Roland Wandura, Limburgerhof (DE); Andreas Wild, Bretten (DE); Jochen Hörnle-Höhl, Stutensee-Friedrichstal (DE)

(73) Assignee: MA micro automation GmbH, St. Leon-Rot (DE)

( * ) Notice: Subject to any disclaimer, the term of this patent is extended or adjusted under 35 U.S.C. 154(b) by 436 days.

(21) Appl. No.: 17/773,308

(22) PCT Filed: Oct. 30, 2020

(86) PCT No.: PCT/EP2020/080556
§ 371 (c)(1),
(2) Date: Apr. 29, 2022

(87) PCT Pub. No.: WO2021/084091
PCT Pub. Date: May 6, 2021

(65) Prior Publication Data
US 2022/0379532 A1 Dec. 1, 2022

(30) Foreign Application Priority Data
Oct. 30, 2019 (DE) ............. 10 2019 129 325.1

(51) Int. Cl.
*B29C 45/17* (2006.01)
*B29C 45/42* (2006.01)
*B29L 31/00* (2006.01)

(52) U.S. Cl.
CPC .......... *B29C 45/1769* (2013.01); *B29C 45/42* (2013.01); *B29L 2031/7544* (2013.01)

(58) Field of Classification Search
CPC . B29C 45/1769; B29C 45/42; B29C 45/4225; B29C 2045/4258; B29C 2045/4266; B29L 2031/7544; B23Q 7/048
(Continued)

(56) References Cited

U.S. PATENT DOCUMENTS 5,443,360 A * 8/1995 Lamb .................. B29C 45/42
                                                    198/434
5,895,192 A * 4/1999 Parnell, Sr. ...... B29D 11/00067
                                                    198/468.4
(Continued)

FOREIGN PATENT DOCUMENTS

DE  10 2009 032 191 B3    4/2011
DE  10 2013 104 804 A1   11/2014
(Continued)

OTHER PUBLICATIONS

The International Bureau of WIPO, International Preliminary Report on Patentability for PCT App. No. PCT/EP2020/080556, May 3, 2022, pp. 1-7.
(Continued)

*Primary Examiner* — Gregory W Adams
(74) *Attorney, Agent, or Firm* — Cahn & Samuels, LLP

(57) ABSTRACT

A handling system and/or a grouping unit of a handling system and a method for handling individual parts that have to be removed from a preceding production process, in particular injection-molded parts in the form of pipette tips that are produced in groups in an injection molding machine with a multiple tool and must be removed from the multiple tool for the further handling, the multiple tool including at least one distributing star having a plurality of mold cavities, whereby a removal arrangement is defined by the multiple tool for the further handling of the injection-molded parts. The method includes removing the finished injection molded parts, loading the parts into a grouping unit to
(Continued)

Figure 1:
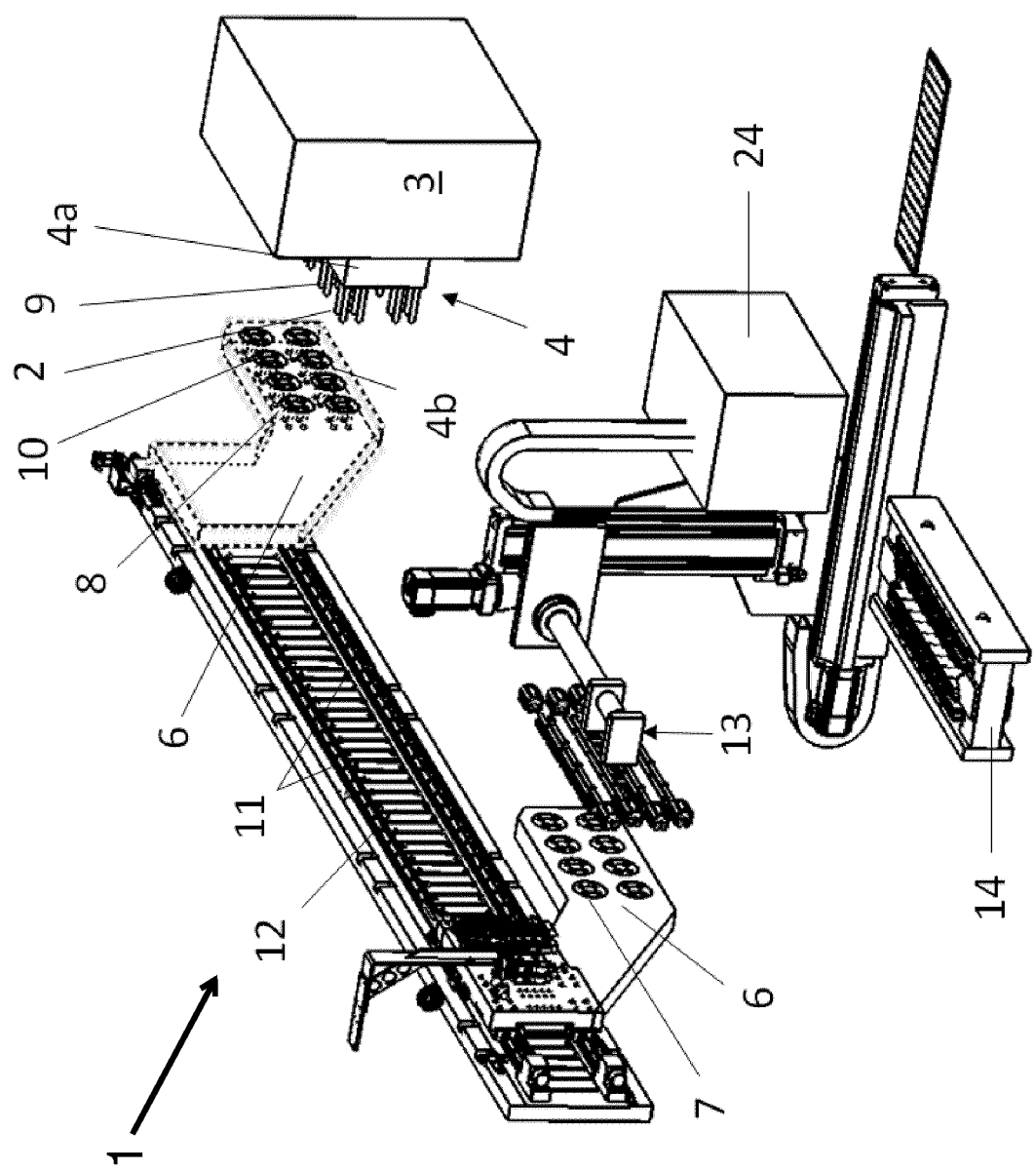

produce a grid arrangement, and removing the parts from one grouping unit with a second grouping unit.

3 Claims, 16 Drawing Sheets

(58) Field of Classification Search
USPC ..... 414/225.01, 728, 222.01, 589; 198/468.4
See application file for complete search history.

(56) References Cited

U.S. PATENT DOCUMENTS

| | | | |
|---|---|---|---|
| 7,077,641 B2 * | 7/2006 | Hirasawatsu | B29C 49/4205 |
| | | | 414/222.11 |
| 7,214,286 B2 * | 5/2007 | Torris | B29C 66/54 |
| | | | 414/788.9 |
| 7,318,722 B2 * | 1/2008 | Drysdale | B29C 49/4205 |
| | | | 198/444 |
| 9,061,780 B2 | 6/2015 | Boos | |
| 10,457,434 B2 | 10/2019 | Faltenbacher et al. | |
| 2004/0185136 A1 * | 9/2004 | Domodossola | B29C 45/42 |
| | | | 425/534 |
| 2006/0121153 A1 * | 6/2006 | Neter | B29C 45/42 |
| | | | 425/556 |
| 2014/0331614 A1 | 11/2014 | Czizegg et al. | |
| 2019/0047196 A1 | 2/2019 | Czizegg et al. | |
| 2021/0261278 A1 | 8/2021 | Kammerloher | |

FOREIGN PATENT DOCUMENTS

| | | |
|---|---|---|
| DE | 10 2013 110 948 A1 | 4/2015 |
| DE | 10 2017 118 527 A1 | 2/2019 |
| WO | 2014121868 A1 | 8/2014 |
| WO | 2015/049350 A1 | 4/2015 |

OTHER PUBLICATIONS

European Patent Office, International Search Report for PCT App. No. PCT/EP2020/080556, May 3, 2022, pp. 3-4.
European Patent Office, English translation for DE10201311098A1, printed on Aug. 13, 2024.

* cited by examiner

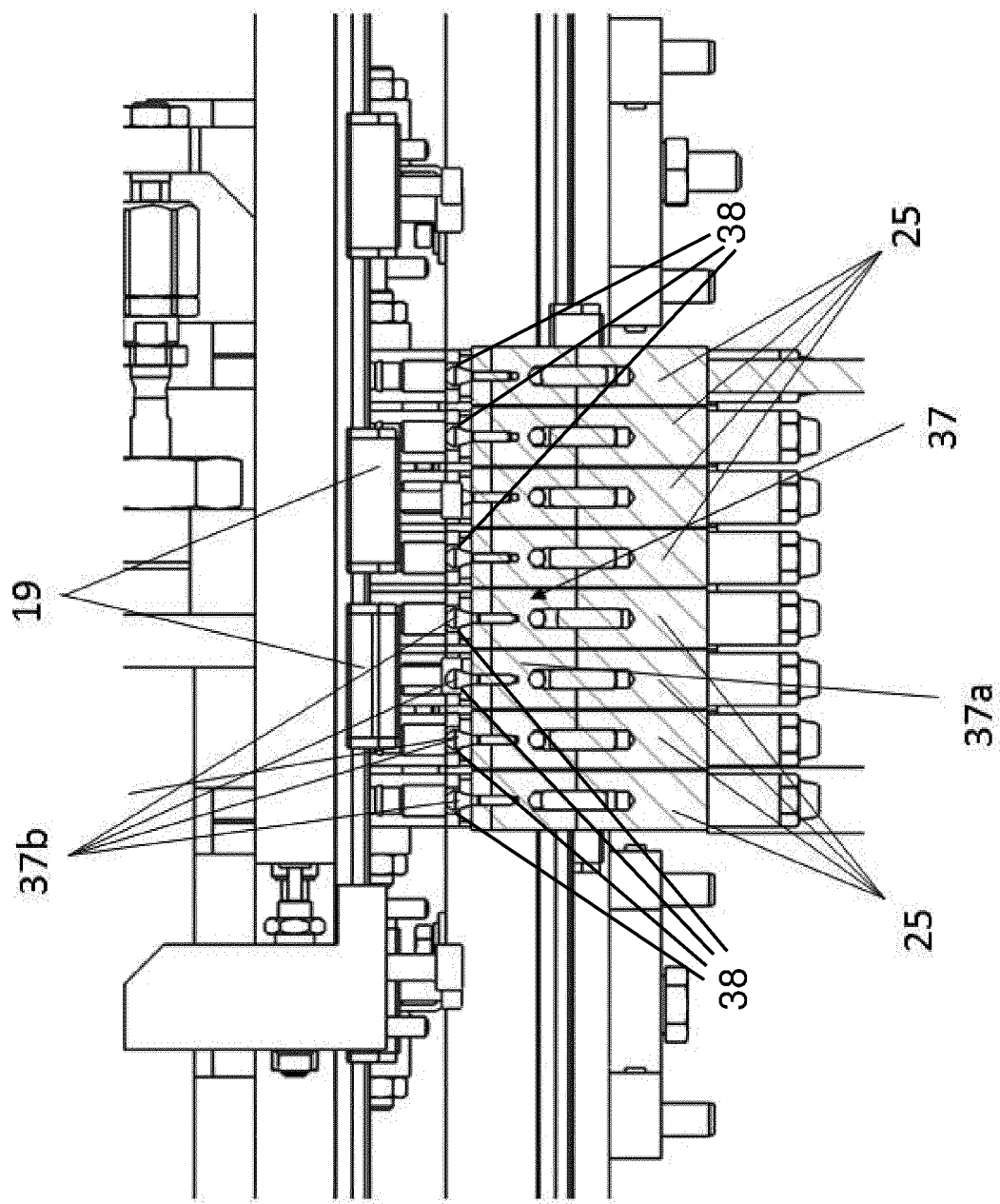

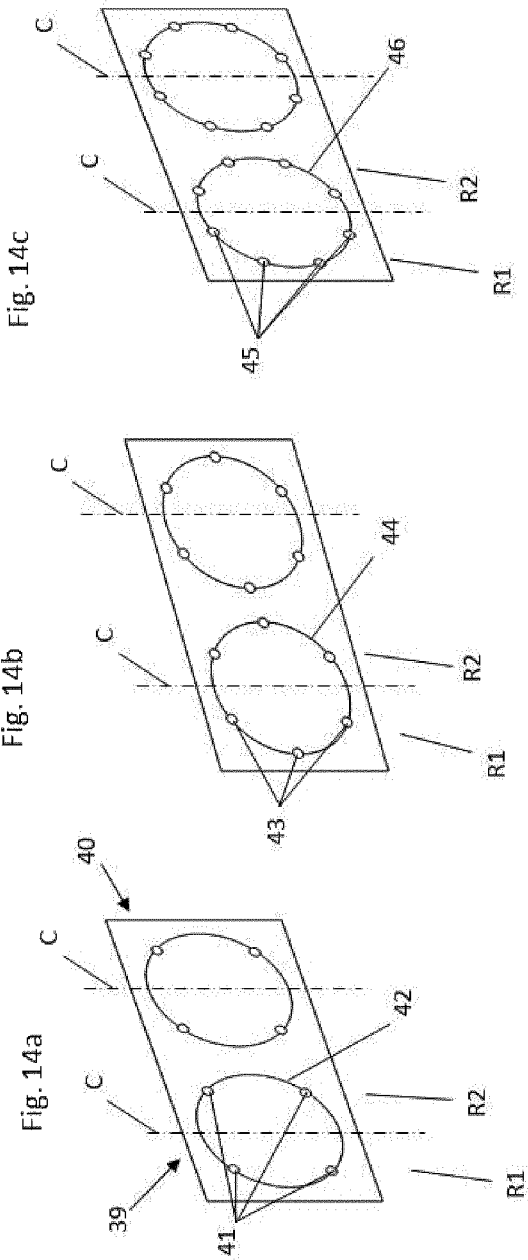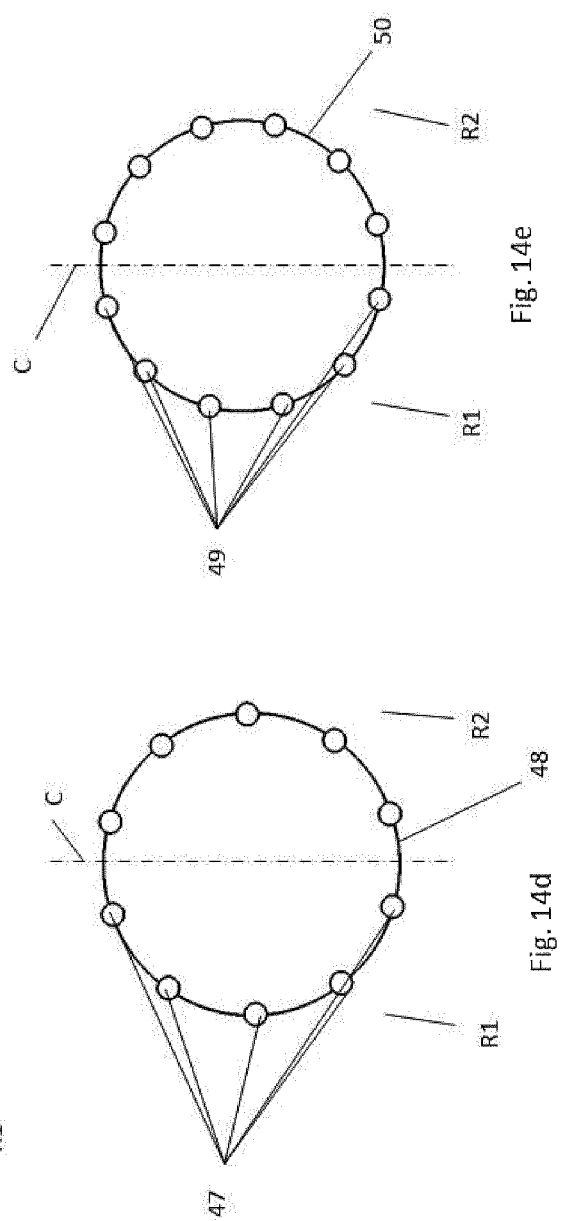

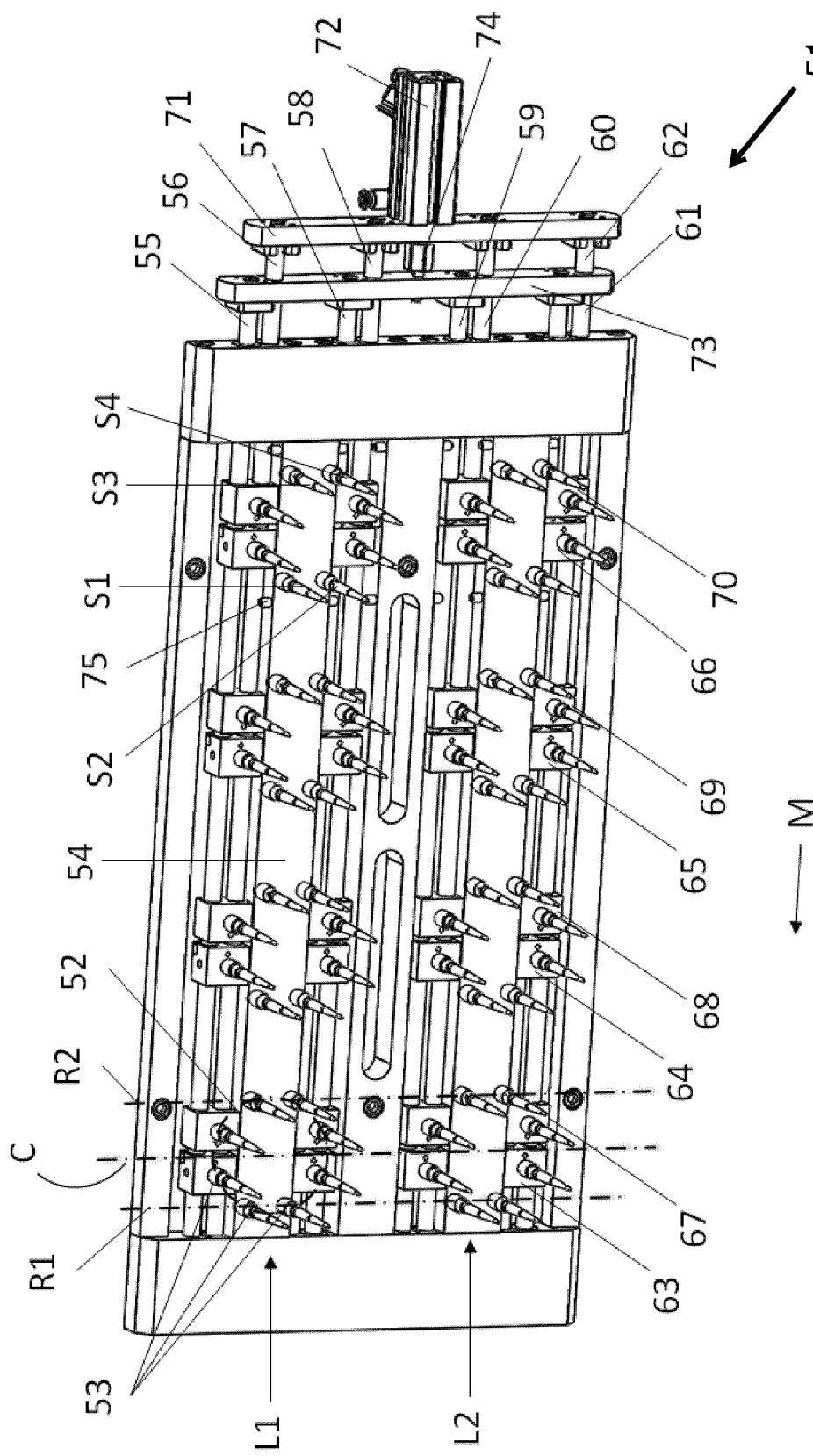

METHOD FOR HANDLING INDIVIDUAL PARTS, HANDLING SYSTEMS, AND GROUPING UNIT

The invention relates to a method for handling individual parts which have to be removed from a preceding production process, in particular injection molded parts in the form of pipette tips, which are produced in large numbers in an injection molding machine using a multi-cavity mold and have to be removed from the multi-cavity mold for further handling, wherein the multi-cavity mold has at least one radial runner system with a plurality of mold cavities, whereby a removal assembly is provided by the multi-cavity mold for further handling of injection molded parts.

It is conventional, when injection molding with a multi-cavity mold, for a plurality of mold cavities to be included which are connected using a radial runner system (or feed system). The multi-cavity mold may also comprise a plurality of such radial runner systems. The radial runner system forms the flow channels for filling the individual mold cavities as far as possible simultaneously and uniformly with molten, flowable plastics. Conventionally, the mold cavities are arranged such that, in the injection molding process, flow paths of equal length are formed therewith in each radial runner system. It should also be mentioned that, instead of a radial runner system, another runner system layout can be provided. A degree of inequality in the flow path length may have to be tolerated, for example if a runner ring with correspondingly adapted flow channel cross-sections is provided. A multi-cavity mold consisting of at least one stationary and at least one mobile mold part is favorable, these parts having at least one parting line. The parting line is conveniently vertically arranged.

Moreover, the invention relates to a device for handling injection molded parts which have to be removed from a multi-cavity mold of the above-described type, which multi-cavity mold has at least one radial runner system with a plurality of mold cavities, a removal assembly being provided thereby for further handling, comprising a removal unit and at least one grouping unit, wherein a grid arrangement with Cartesian coordinates is produced, in which the grid dimension is reduced in both coordinate directions.

Then, the injection molded parts in the produced compact small grid can be transferred into a finished part holder for further processing. This transfer may be performed directly by the second grouping unit or indirectly by another assembly.

Furthermore, the invention relates to a grouping unit and a repositioning unit for the device for handling injection molded parts, comprising at least two support strips each for receiving one row of injection molded parts.

A method of this generic type and a handling system provided for packaging injection molded parts are known from WO 2015/049350 A1. Therein, the injection molded parts emerge from a multi-cavity mold in groups each of eight injection molded parts. A removal unit is provided which can remove the groups of eight from the multi-cavity mold in one step, wherein, however, the removal unit is arranged together with an associated controller such that it can only place injection molded parts removed from the multi-cavity mold into a "transfer station" in a plurality of successive steps. In the transfer station, "compaction" proceeds only in a longitudinal direction, to bring the rows into a more compact arrangement, wherein to this end a "receptacle" for the injection molded parts is designed to be pushed together either only from the top downward or only from the bottom upward. Provision is additionally made for the transfer station, after compaction, to be pivoted over a workpiece carrier, said compaction being performed preferably during pivoting.

DE 10 2017 118 527 A1 relates to a handling device for removal of individual parts, in particular plastics injection molded parts, such as pipette tips, medical reaction vessels or contact lens casting molds. It comprises a removal gripper with a plurality of receiving positions for in each case receiving one plastics injection molded part from one of the cavities in each instance.

DE 10 2009 032 191 B3 discloses a packaging method for packaging plastics injection molded parts, such as pipette tips or medical reaction vessels. The method comprises the steps: simultaneously removing plastics injection molded parts from cavities, depositing the plastics injection molded parts in an intermediate storage device and loading packaging units each having plastics injection molded parts from the intermediate storage device. In this known method, provision is made for an intermediate storage device with a plurality of depositing positions to be used, wherein the depositing positions are arranged next to each other in a deposition plane. The plastics injection molded parts are deposited distributed uniformly into subgroups in the intermediate storage device, wherein plastics injection molded parts are removed from the cavities and uniformly distributed into the subgroups until each subgroup has plastics injection molded parts, wherein the number of plastics injection molded parts in a subgroup corresponds to the number of plastics injection molded parts which are to be loaded into a packaging unit or an integral divisor thereof. DE 10 2009 032 191 B3 further describes a packaging device and an injection molding installation having such a packaging device.

DE 10 2013 104 804 A1 proposes a method for packaging plastics injection molded parts in end packaging units. The plastics injection molded parts may be pipette tips or medical reaction vessels. Provision is made for these injection molded parts to be deposited in an intermediate buffer prior to division into subgroups in a deposition plane. First deposition means and separate second deposition means are provided, in particular with a hose package or with a gripper.

The object of the present invention is to provide a more variable method for handling injection molded parts which have to be removed from a multi-cavity mold, wherein however groups other than groups of eight are also to be handleable, and wherein a two-dimensional grid arrangement of the injection molded parts, when the removal unit has unloaded them in the removal assembly, is then intended to be more compactly grouped, specifically in two coordinate directions of the grid arrangement.

According to the invention, this object is achieved with a method comprising the following method steps:

a) the finished injection molded parts are removed from all existing mold cavities of the multi-cavity mold at once in a single method step and delivered to a transfer unit, which, in the subsequent course of the method, transfers the injection molded parts into a first grouping unit, b) the injection molded parts are introduced into the first grouping unit in the form of a two-dimensional grid, with the proviso that the grid has at least two rows each with two injection molded parts, c) when loaded, the first grouping unit moves the injection molded parts of parallel mutually adjacent rows toward one another, so as to produce a more compact grid arrangement of the injection molded parts in a first coordinate direction, d) the injection molded parts are then removed from the first grouping unit with a second grouping unit, wherein the distance between the rows in the second coordinate direction is likewise reduced using the second grouping unit, so as to produce a more compact, tighter grid in both coordinate directions.

Then the injection molded parts in the produced compact small grid can be transferred into a finished part holder for further processing, which corresponds to a method step e), which may be added to the method according to the invention and to the handling system provided therefor. Said transfer may be performed directly by the second grouping unit or indirectly by another assembly.

The injection molded parts are delivered in one step by the removal unit into the further process. To be able to introduce the injection molded parts according to method step b) directly from the multi-cavity mold into the first grouping unit as a two-dimensional grid with parallel rows of equal numbers, the grid has space for at least two injection molded parts in the direction of each of the two coordinates. A corresponding removal assembly is then directly present if the multi-cavity mold already has one or more radial runner systems each with four mold cavities. The four mold cavities are arranged in polygonally uniform manner, i.e. in a square, on a circumcircle. The injection molded part removal assembly is then already directly a Cartesian grid arrangement in aligned lines, specifically both in the direction of the one and in the direction of the second coordinate of the grid in aligned lines or rows and columns.

If a multi-cavity mold is intended to have a radial runner system with more than four mold cavities, then even-numbered radial runner systems are conveniently provided with 6, 8, 10 or 12 mold cavities, which are in each case arranged polygonally. In these instances, the removal assembly does not yet have an arrangement composed of two parallel rows. Consequently, an intermediate step is required, which repositions the respective polygonal removal pattern into a two-row arrangement with parallel rows in each case with an identical number of injection molded parts.

Preferably, therefore, a removal assembly for the injection molded parts is specified by the multi-cavity mold which has a regular convex polygon with an even number of vertices, preferably (n)≥4, on a circumcircle, wherein the injection molded parts lie at the vertices of the polygon, with the proviso that a midline divides the number of injection molded parts symmetrically and equally with regard to numbers and, in the case of a number greater than four vertices/injection molded parts, the following intermediate step is performed between method steps a) and b):

a$_1$) innermost injection molded parts relative to the midline are moved outward until they are aligned in the same line with the outlying injection molded parts, such that two parallel rows are formed from all (n) injection molded parts.

Furthermore, it is useful for a midline to be defined in the first grouping unit and/or in the second grouping unit, which midline lies symmetrically between the parallel adjacent rows of injection molded parts, and for the adjacent rows of injection molded parts to be moved symmetrically toward the midline. As a result of this measure, two groups are formed each of multiple rows of injection molded parts. Instead of moving all the rows in one direction, the rows are moved symmetrically relative to the midline. This means that all the rows are moved and the maximum movement distance decreases in this way and movement proceeds more quickly.

To carry out a method according to the invention, a handling system is proposed for injection molded parts which have to be removed from a multi-cavity mold, which multi-cavity mold comprises at least one radial runner system with a plurality of mold cavities and whereby a removal assembly for further handling of the injection molded parts is specified, wherein the handling system comprises a removal unit, a transfer unit and at least one first grouping unit ("type case"), wherein a grid arrangement with Cartesian coordinates is produced, in which the grid dimension is reduced in both coordinate directions, wherein a second grouping unit is provided, wherein each of the grouping units has separate transversely mobile support strips, wherein the support strips are coupled via a linear bearing arrangement to at least one guide rail, wherein an individual movement path with individual movement end points is provided for at least some of the support strips, and at least one pusher element is provided, with which at least one of the support strips is movable to and fro between its individual movement end points.

The removal assembly, which is specified by a multi-cavity mold, conveniently provides a number of 4 or more mold cavities per radial runner system, in particular an even number of 6, 8, 10 or 12 mold cavities is convenient, these being arranged polygonally per radial runner system. In the stated instances, which produce 6 to 12 injection molded parts arranged polygonally, one particular transfer unit is provided, with which the polygonal removal assembly is repositionable into a two-rowed grid arrangement which has two rows of equal numbers of injection molded parts, i.e., two rows each of three injection molded parts (2×3 grid of injection molded parts) or 2×4, 2×5 or 2×6 grids of injection molded parts.

A further developed transfer unit is proposed below as part of the handling system proposed herein. The further developed transfer unit is, however, furthermore regarded as an independent invention. The transfer unit is always convenient for the handling system when the removal assembly in which the injection molded parts come out of the multi-cavity mold is not yet a row-form grid arrangement, i.e., does not yet have rows of equal numbers of injection molded parts, but rather is based on the conventional radial runner systems comprising 6 to 12 polygonally arranged mold cavities which are preferably arranged uniformly on a circumcircle.

The improvement for the handling system is thus considered to be that, in the case of a stated removal assembly, which is based on a multi-cavity mold with an even number of more than four mold cavities per radial runner system, i.e., a number of 6, 8, 10 or 12 injection molded parts, the stated transfer unit is provided with a repositioning device with which a two-row grid arrangement of 2×3, 2×4, 2×5 or 2×6 injection molded parts can be produced from a polygonal arrangement preferably distributed uniformly around a circumcircle, wherein for the polygon of the removal assembly a midline is defined which divides the injection molded parts symmetrically into two groups of equal numbers, wherein the midline is arranged such that none of the injection molded parts lies directly on the midline but rather all the injection molded parts are spaced from the midline, wherein the furthest outlying injection molded parts relative to the midline define the position of parallel outer lines, wherein a base element is provided which has stationary receptacles for the injection molded parts lying on the outer lines, and wherein for all the other injection molded parts mobile receiving elements are provided in order to move them, divided symmetrically, toward the outer lines and produce a two-row grid arrangement.

On the circumcircle, either one injection molded part is located to the outside per symmetrical half (e.g.: 6-sided and 10-sided polygon) or in each case two injection molded parts are located on a parallel line to the midline to the outside per symmetrical half (e.g.: 4-, 8- and 12-sided polygon).

In the case of a 4-sided polygon, all the injection molded parts are already arranged in two rows symmetrically relative to the midline. Repositioning is not necessary in such a case.

With a 6-sided and likewise an 8-sided polygon, there is just one injection molded part on each quarter of the circumcircle which does not lie on the outer line. With a 6-sided and 8-sided polygon, these injection molded parts have to be displaced outward to be aligned on the same outer line.

With a 10- and 12-sided polygon, two injection molded parts are located on each quarter circle which are not on the outer line. The two injection molded parts are at different distances from the outer line, one closer and the other further away. In all, eight injection molded parts have to be moved, four over a short distance and the other four over a longer distance.

The transfer unit comprises the stated base element, on which receptacles are stationarily arranged for those injection molded parts which are already located on the outer lines. The receptacles are thus arranged parallel to the midline and symmetrical thereto and fixed to the base element. All the other injection molded parts which are initially located closer to the midline have to be moved outward to the outer lines using the repositioning device. To this end, the repositioning device has the mobile receptacles at appropriate points and in appropriate numbers.

For a 6-sided and an 8-sided arrangement, the repositioning device is provided with in each case four mobile receptacles. Each of the four mobile receptacles of a 6-sided arrangement travels the same distance but in symmetrical orientation, i.e., in twos in opposing directions. The same is true of an 8-sided arrangement.

For a 10-sided and a 12-sided arrangement, the repositioning device is provided in each case with eight mobile receptacles for injection molded parts, wherein four mobile receptacles have to travel a shorter distance to the outer line, in each case two of which in the same direction but on spaced parallel trajectories, and two on an aligned movement path, but in opposing directions. The same is true of the other four mobile receptacles, wherein merely a longer distance has to be traveled up to the outer line.

The repositioning device is conveniently provided with pusher rods, which displace the mobile receptacles. If a removal assembly composed of a plurality of radial runner systems is present, then multiple mobile receptacles are conveniently identically aligned, wherein those mobile receptacles which have to be moved in the same direction simply interact with the same pusher rod.

Furthermore, according to the proposed transfer unit concept, in a 10-sided and a 12-sided arrangement there are mobile receptacles of the repositioning device which are not in alignment but rather are parallel. These may likewise have the same direction of movement and the same distance to travel. To this end, two parallel pusher rods are conveniently provided. For drive of the two parallel pusher rods, a coupling and a common drive device may be provided, for example a fluid-driven cylinder or other suitable drive device, with which a rectilinear movement may be produced.

Furthermore, a grouping unit is proposed for a handling system where the grouping unit includes at least two support strips in each case for receiving one row of injection molded parts, wherein at least one guide rail is provided, wherein a linear bearing arrangement is provided for each support strip, wherein the support strips are coupled to the guide rail so as to be movable transversely of their longitudinal direction using the linear bearing arrangement, and wherein a closed state of the support strips is provided with minimum spacing of the support strips relative to one another, and a spread-out state of the support strips is provided in which a greater spacing is provided between the support strips which corresponds to the grid dimensions of arriving injection molded parts.

The grouping unit is the core component of the handling system. It serves to receive injection molded parts in a grid arrangement with parallel rows and then to move the rows toward one another and group them compactly.

It is beneficial for at least one pusher element to be provided for the purpose of simultaneous translational movement of a plurality of support strips, which support strips have individual movement distances between their position in the closed state and their position in the spread-out state.

A further benefit arises if a single pusher element is provided in the grouping unit for all support strips which are to be moved simultaneously in the same direction, wherein a projecting driver element is associated with each support strip, which driver element interacts with pairs of pusher faces of the pusher element, and wherein the distance present in the movement direction between the pusher faces of one pair is in each case adapted to the individual movement distance for the mobility of the corresponding support strip between its position in the closed state and its position in the spread-out state.

Advantageously, the stroke of the pusher element corresponds to the movement distance of that support strip which has to travel the greatest distance between its position in the closed state and its position in the spread-out state.

The grouping unit can be further improved if two pusher elements are provided and two groups of support strips are symmetrically movable with in each case one pusher element.

The range of use of the grouping unit can be enlarged if the support strips are arranged upright on the guide rail or alternatively suspended from the guide rail. More simply, the grouping unit is optimized either for upright support strips or for suspended support strips.

An additional improvement to the grouping unit is moreover obtained if upright arranged support strips are provided which have a row of receiving openings, such that in each case one injection molded part is receivable into one receiving opening, or alternatively suspended support strips are provided with receiving elements via which injection molded parts are vacuum-couplable as a vertically movable load.

Furthermore, the invention comprises a handling system according to the invention and/or a grouping unit according to the invention, in particular in combination with one another, adapted to carry out the method according to the invention.

Figure 2:
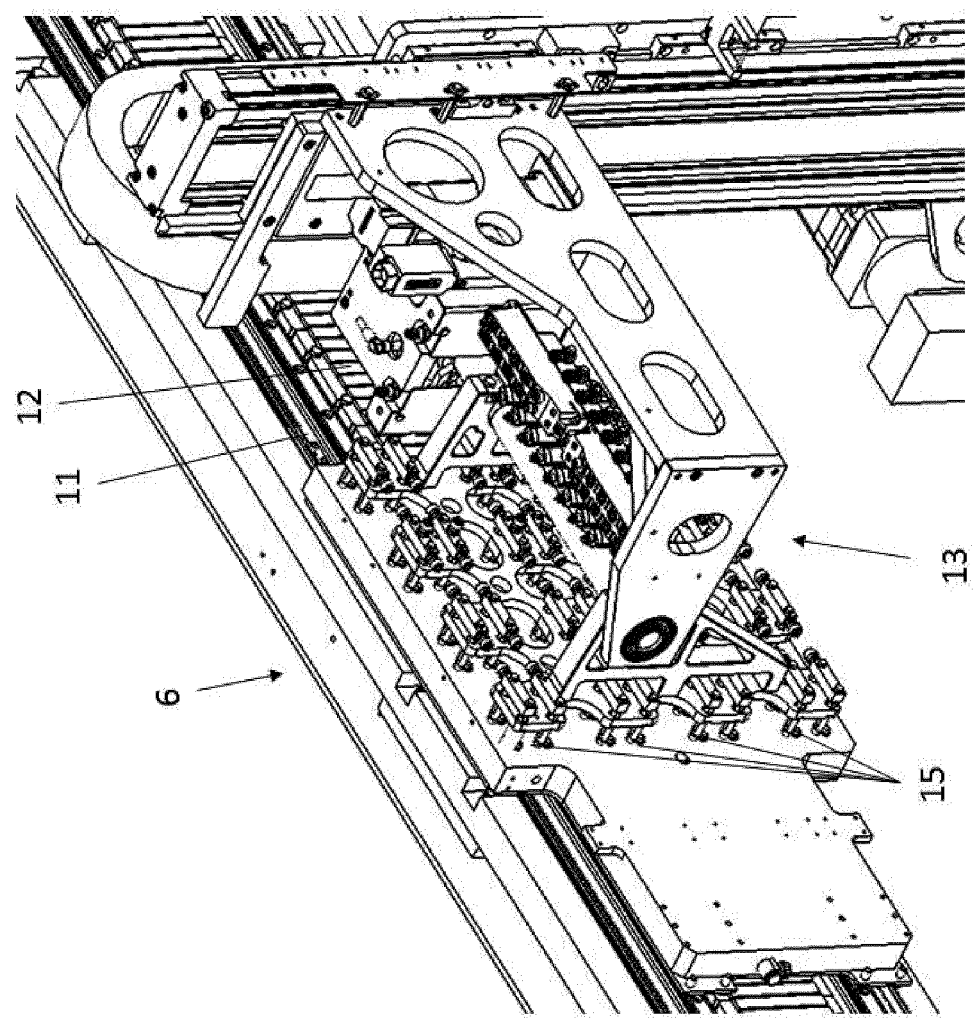
Figure 3:
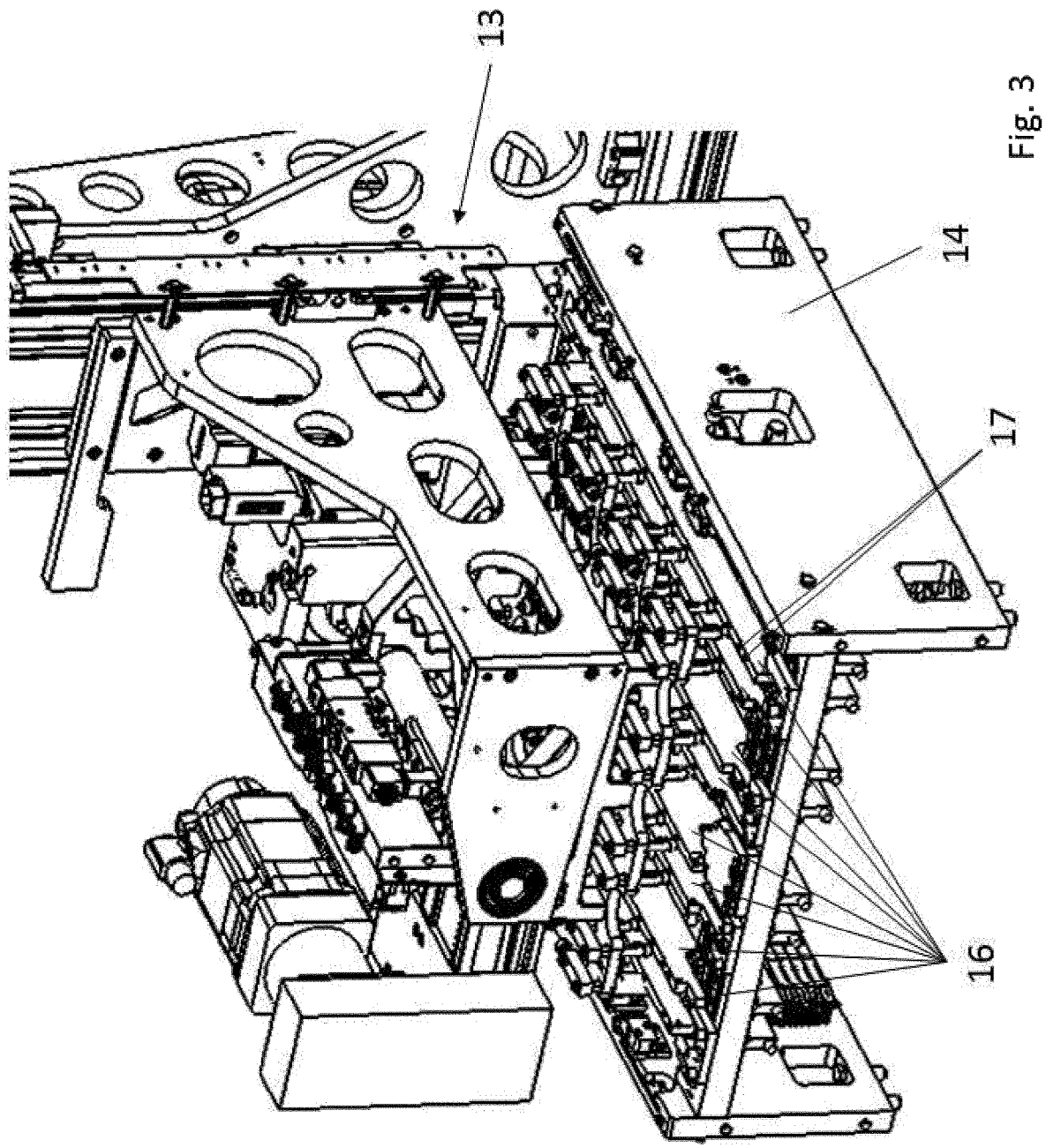
Figure 4:
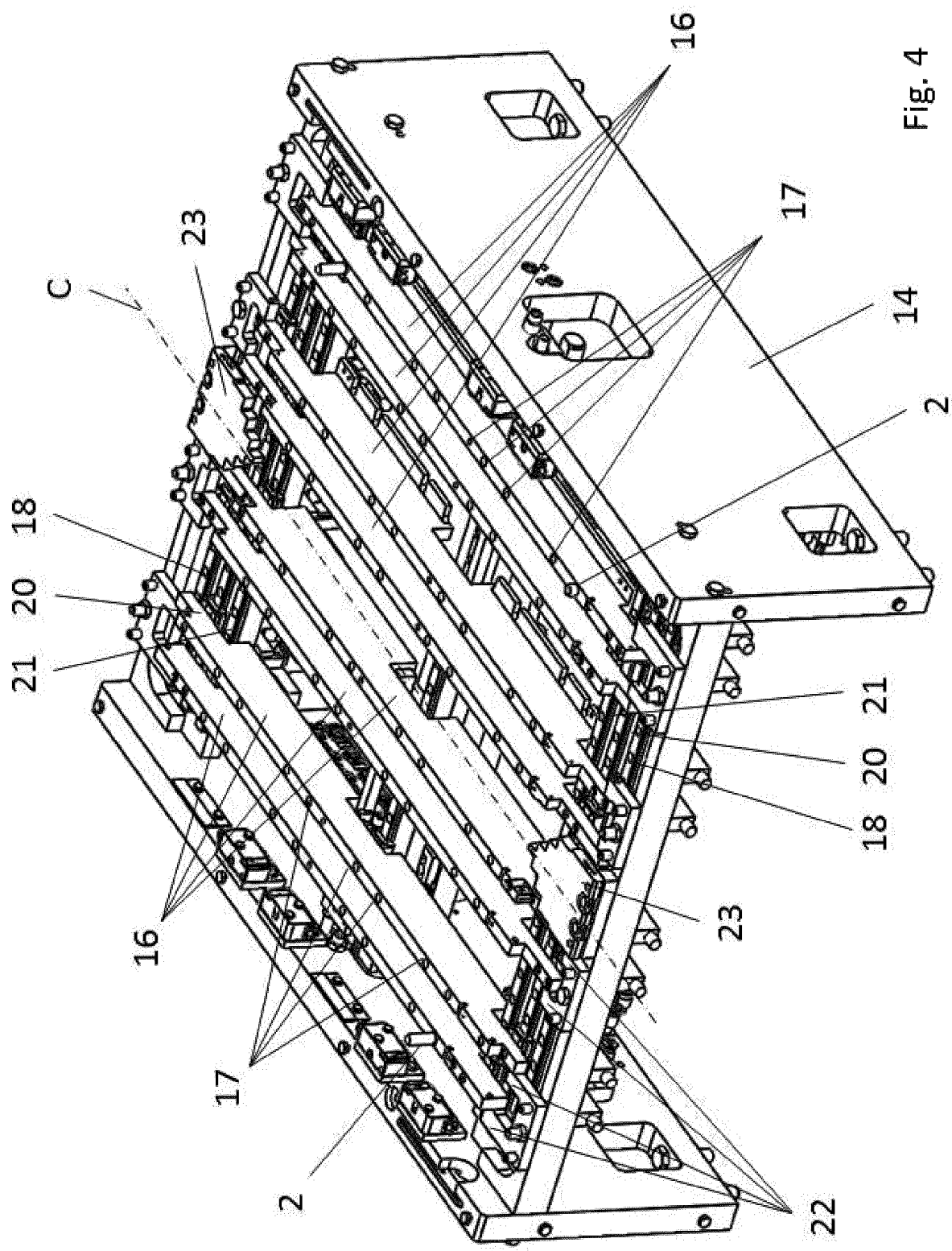
Figure 5:
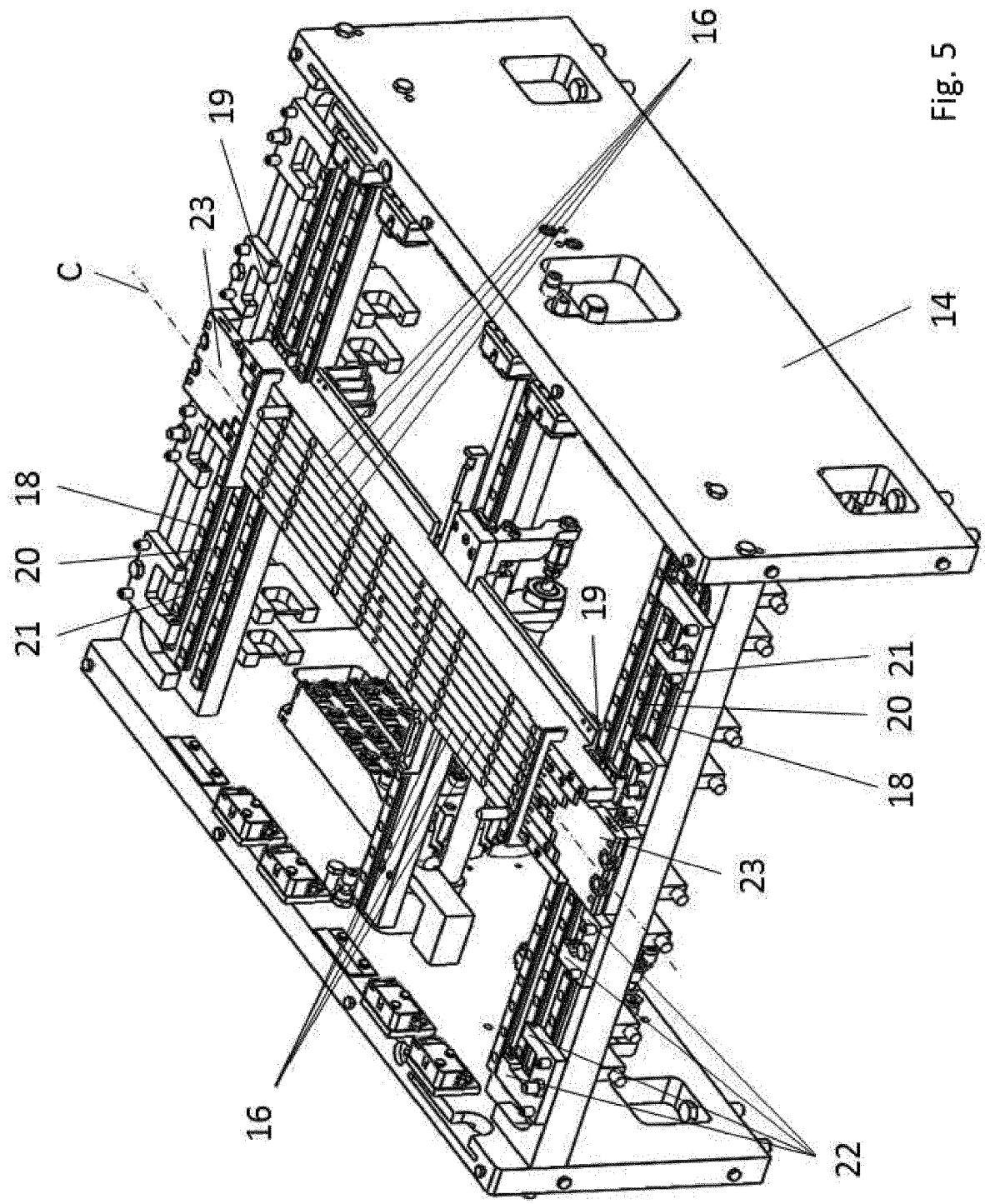
Figure 6:
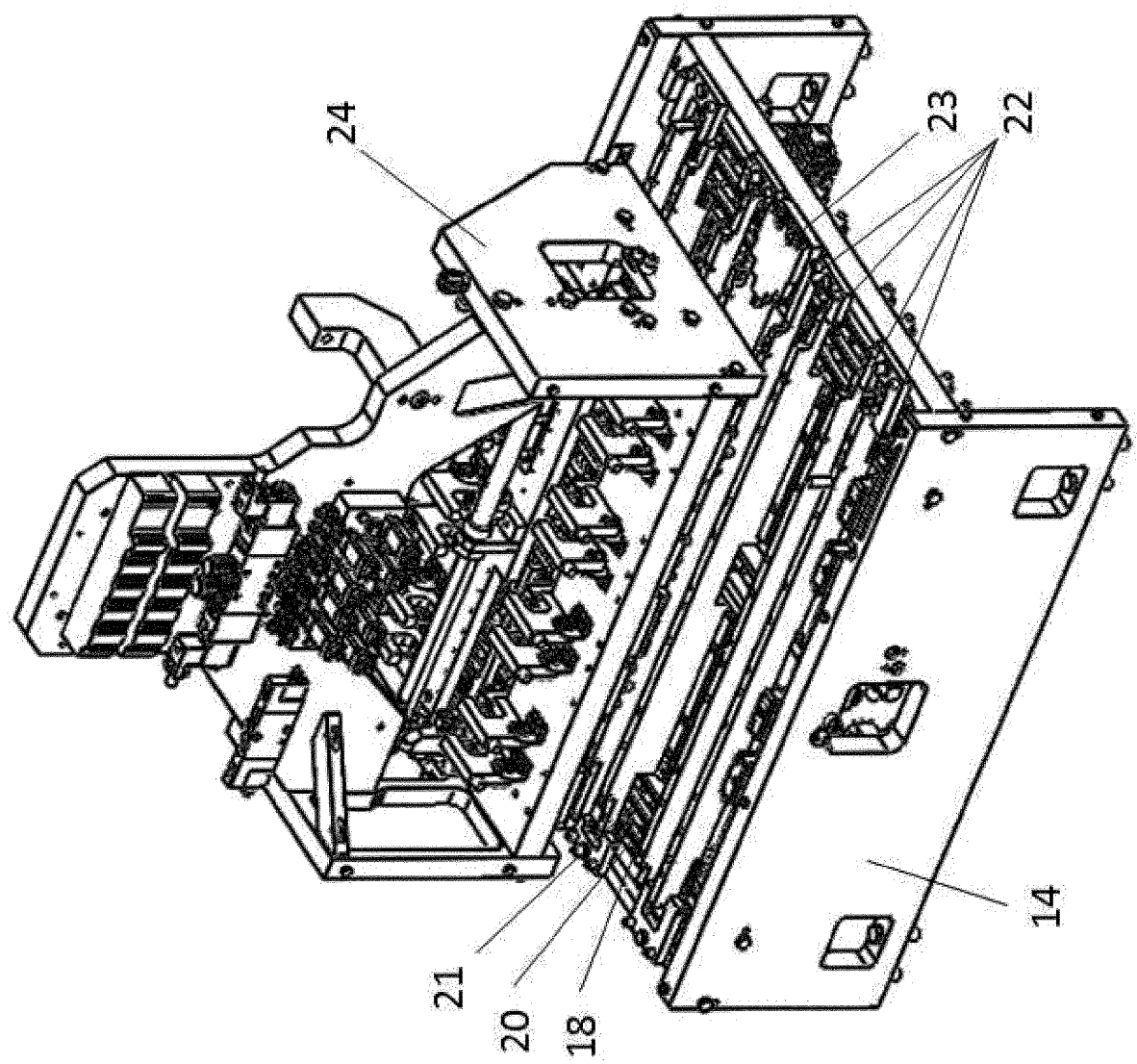
Figure 7:
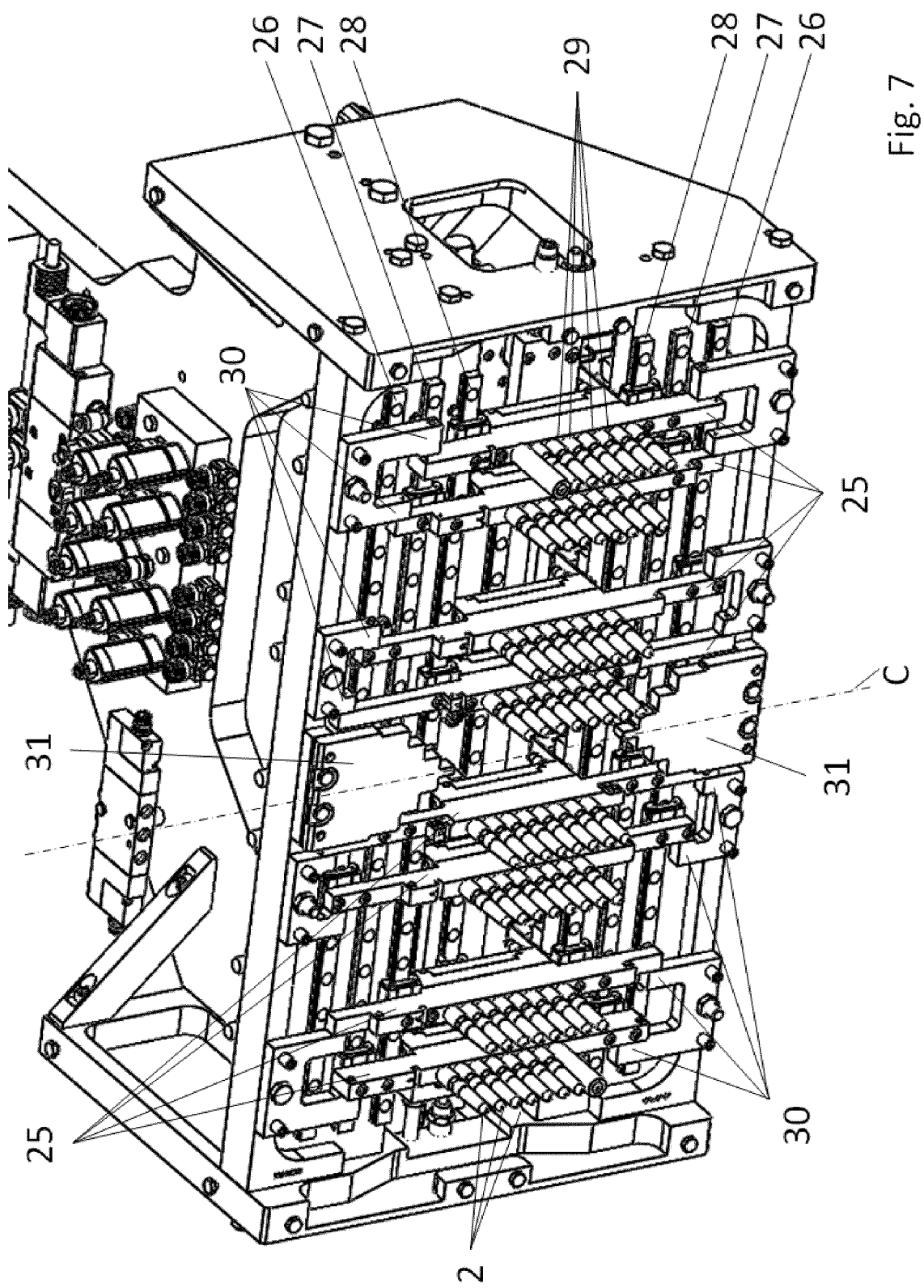
Figure 8:
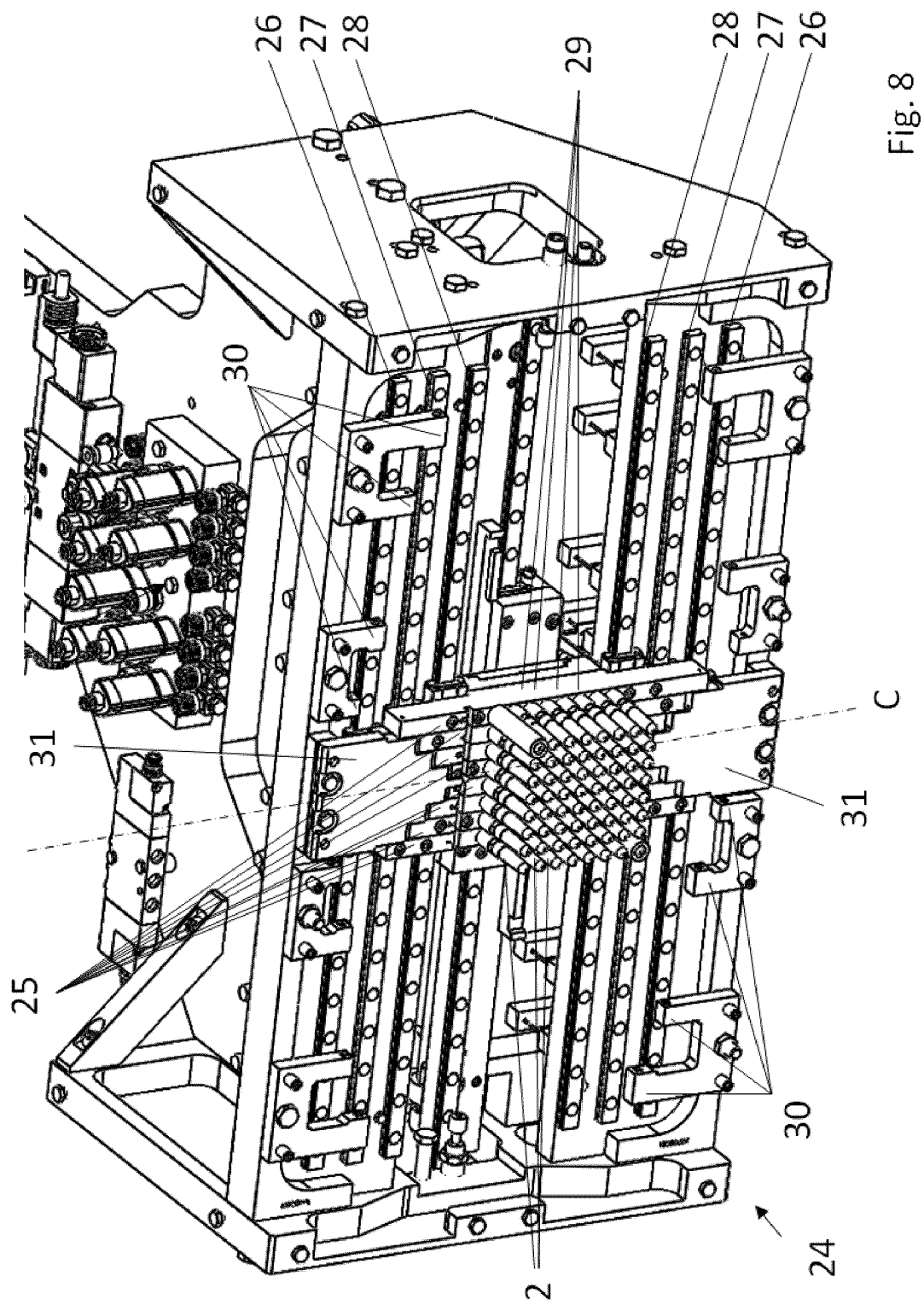
Figure 9:
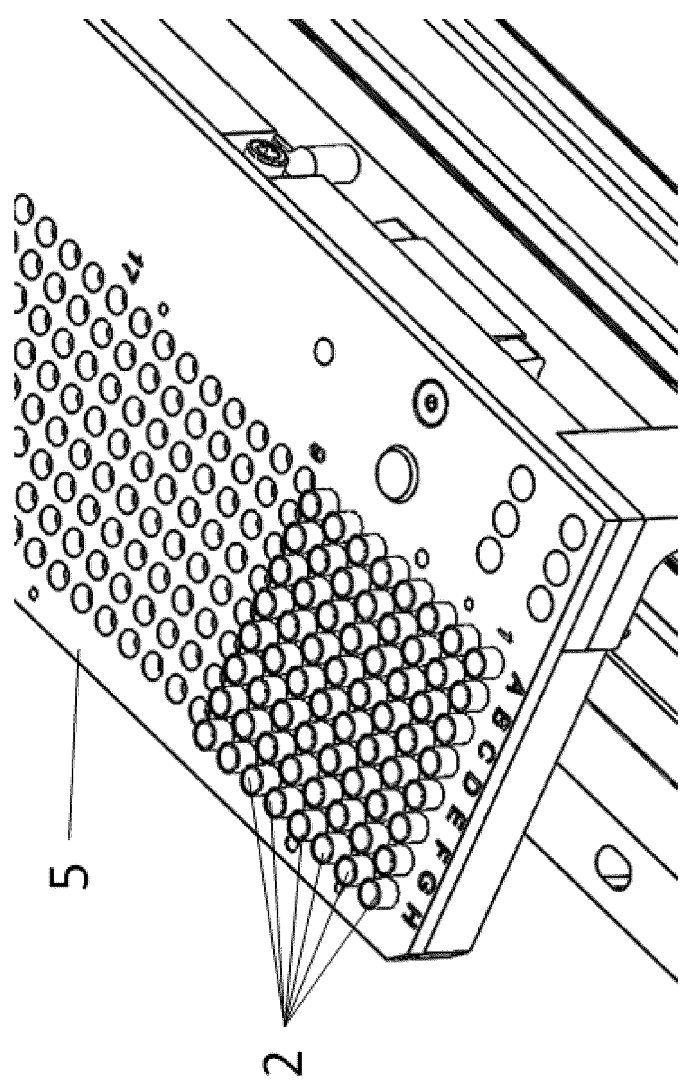
Figure 10:
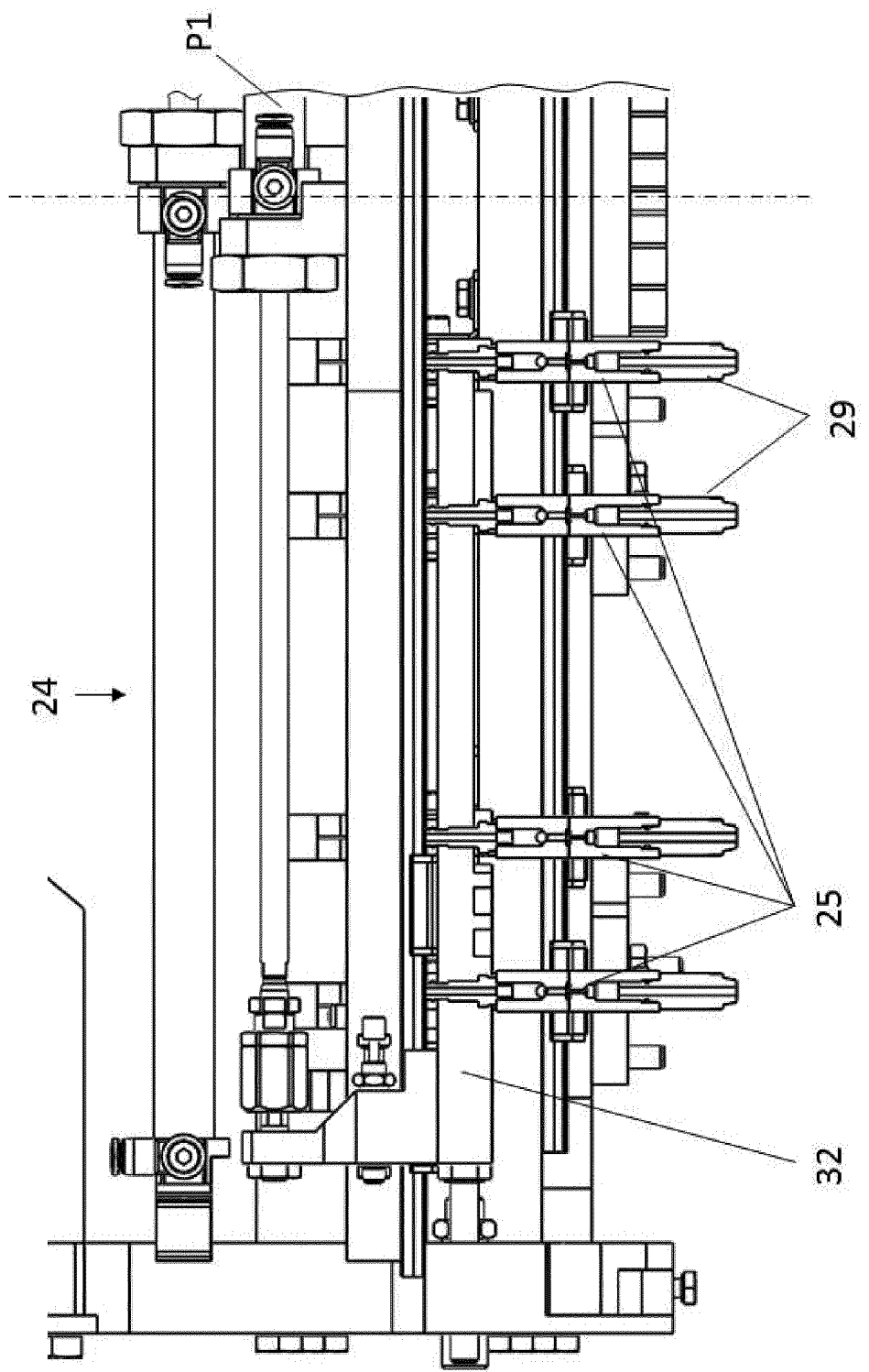
Figure 11:
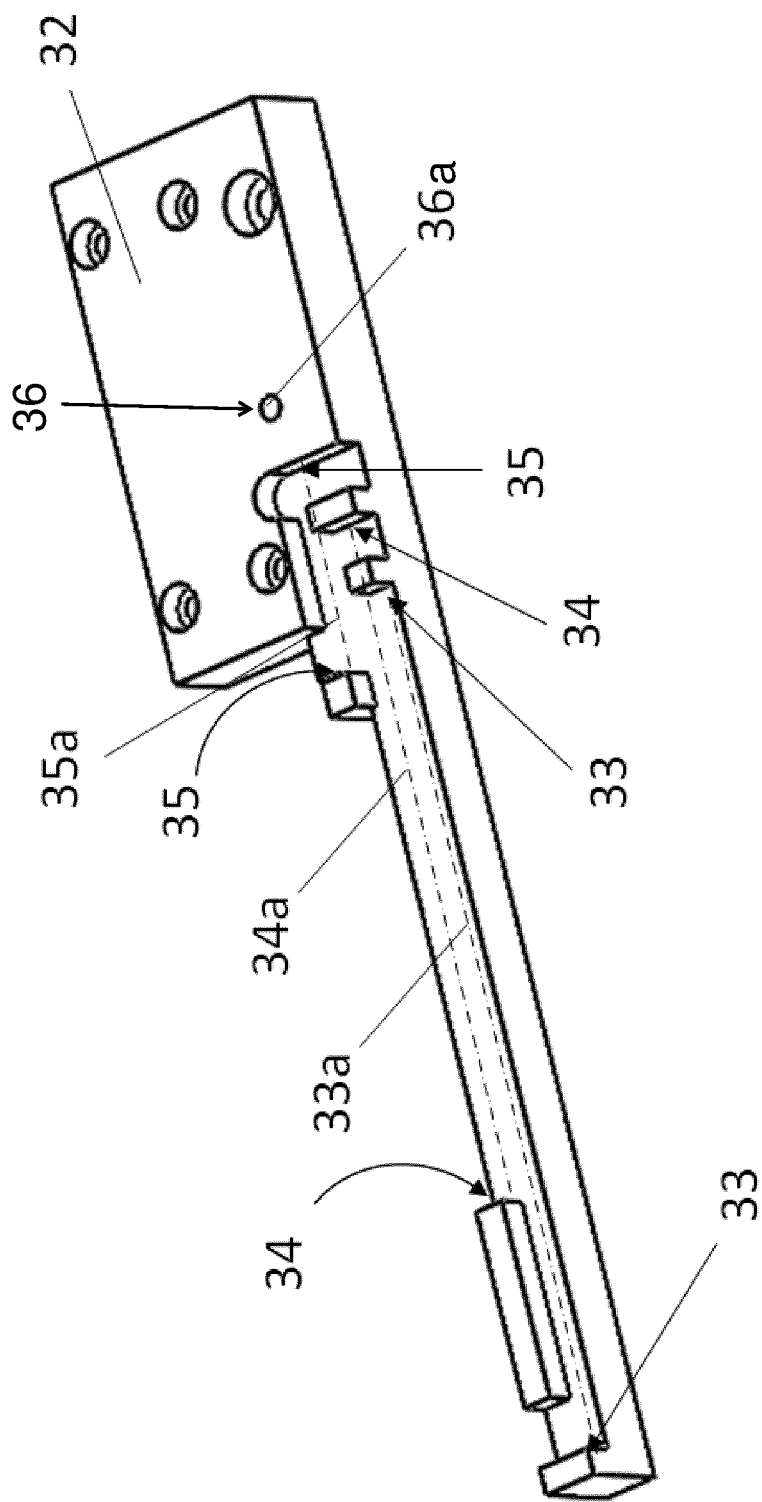
Figure 16:
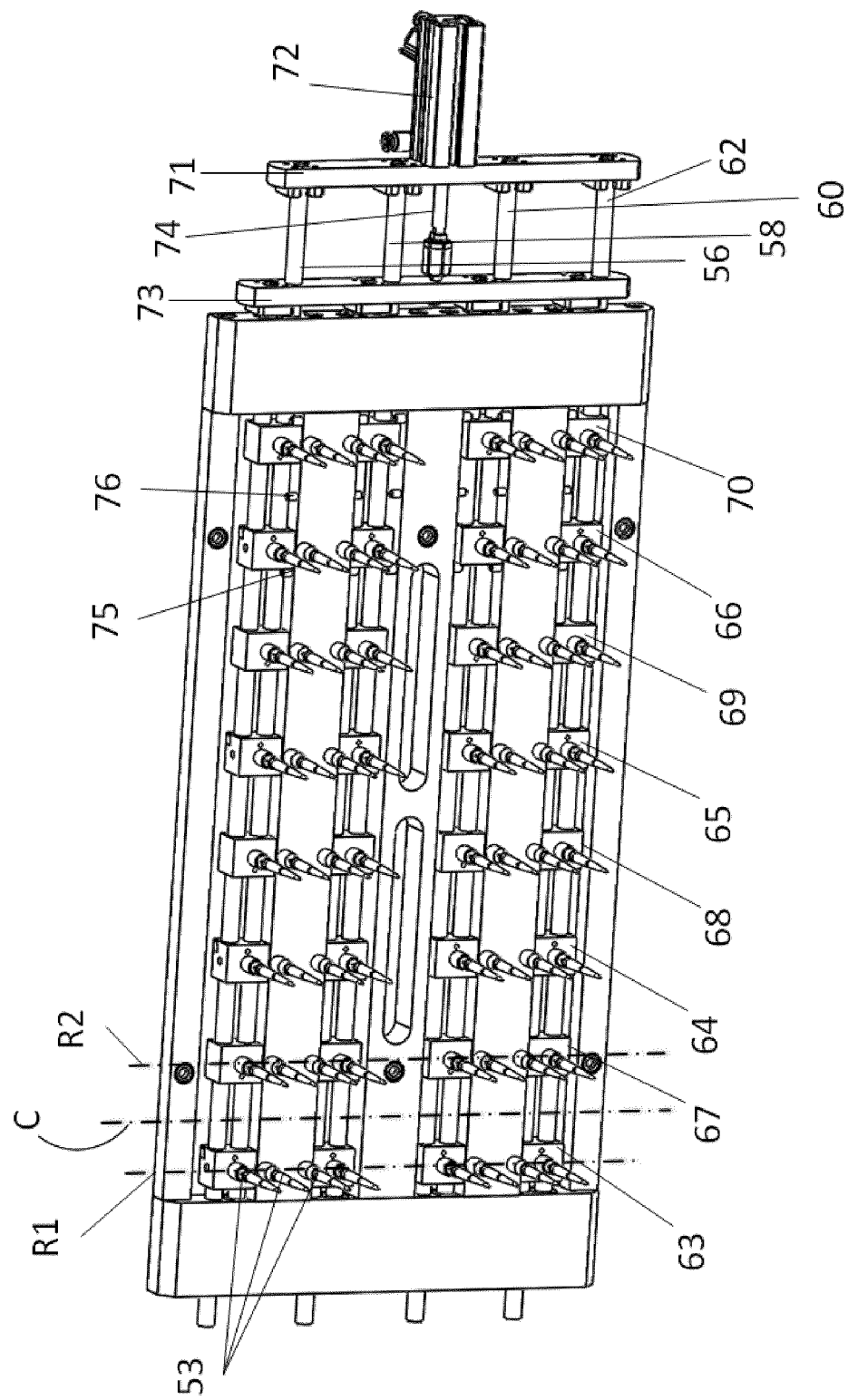

The invention is illustrated below by way of example in drawings and described in detail with reference to several figures, in which:

FIG. 1 is a schematic representation a handling system according to the invention for injection molded parts, FIG. 2 shows a portion of the handling system according to FIG. 1 with depicted removal unit and transfer unit, FIG. 3 shows a portion of the handling system according to FIG. 1, with the transfer unit and a first grouping unit, FIG. 4 shows the first grouping unit according to FIG. 3, comprising support strips, depicted in the spread-out state thereof, FIG. 5 shows the first grouping unit according to FIG. 3 with its support strips in the closed state, FIG. 6 shows the first grouping unit according to FIG. 5 and a second grouping unit for receiving suspended injection molded parts, FIG. 7 is a view from below onto the second grouping unit with the support strips thereof in the spread-out state, FIG. 8 shows the second grouping unit according to FIG. 7 with its support strips in the closed state, FIG. 9 shows a finished part holder loaded with injection molded parts in a grid arrangement, FIG. 10 shows a portion of the first grouping unit according to FIG. 4 with support strips in the spread-out state, FIG. 11 shows a pusher element of the grouping unit according to FIGS. 4, 5 and 10, FIG. 12 shows a portion of the first grouping unit according to FIG. 5 with support strips in the spread-out state, FIG. 13 shows a portion of the first grouping unit according to FIG. 5 with driver elements provided on the support strips, FIG. 14a shows a 4-sided removal assembly based on a multi-cavity mold for injection molding with two radial runner systems, FIG. 14b shows a 6-sided removal assembly based on a multi-cavity mold for injection molding with two radial runner systems, FIG. 14c shows an 8-sided removal assembly based on a multi-cavity mold for injection molding with two radial runner systems, FIG. 14d shows a 10-sided removal assembly based on a multi-cavity mold for injection molding with two radial runner systems, FIG. 14e shows a 12-sided removal assembly based on a multi-cavity mold for injection molding with two radial runner systems, FIG. 15 shows a repositioning device for an 8-sided removal assembly of injection molded parts, for which a polygonal starting position on a circumcircle is provided, FIG. 16 shows the repositioning device according to FIG. 15 in a repositioned position for a two-row arrangement of in each case four injection molded parts.

FIG. 1 is a schematic diagram of a handling system 1 for individual parts, which have to be removed from a preceding production process, the individual parts here being pipette tips 2 which are produced in large numbers in an injection molding machine 3 using a multi-cavity mold 4.

For further handling, these injection molded parts (pipette tips) must be removed from the multi-cavity mold 4, wherein the multi-cavity mold has at least one radial runner system with a plurality of mold cavities, whereby a removal assembly is fixedly specified by the multi-cavity mold 4 for further handling of these injection molded parts.

Right at the end of the handling steps, the pipette tips should be arranged compactly and be capable of being delivered to a finished part holder 5. The injection molding machine 3 and the finished part holder 5 are depicted in FIG. 1 for the sake of completeness. However, they are not part of the handling system.

The multi-cavity mold contains a systematic arrangement of the mold cavities. According to FIG. 1, the pipette tips come from such a multi-cavity mold 4, which has eight radial runner systems, wherein each radial runner system comprises four mold cavities. In the present example, the eight radial runner systems are arranged in two rows one above the other. The top row comprises four radial runner systems, each of which forms a group of 4 pipette tips arranged on a circumcircle 7. A bottom row comprises a further four radial runner systems with groups of 4 pipette tips, which are arranged on a circumcircle 8. In this way, the removal assembly according to FIG. 1 forms an array of 64 pipette tips, which lie in a vertical plane.

The removal unit 6 serves to transfer all 64 pipette tips in the stated vertical array out of the multi-cavity mold 4. In the present example, the multi-cavity mold is formed of two mold parts 4a and 4b. The two mold parts may open and close at a vertical parting plane. To this end, one mold part 4a is arranged stationarily and the other mold part 4b movably, so as by this movement to bring about opening and closing of the multi-cavity mold 4.

The removal unit 6 is moved toward the multi-cavity mold 4 when the latter is opened, in order then to accept finished produced pipette tips 2.

On its stationary mold part 4a, the multi-cavity mold comprises a mandrel 9 for each pipette tip, which mandrel is part of the mold cavity and serves to shape the inner contour of the pipette tip 2. When the multi-cavity mold 4 is in the open state, finished injection molded pipette tips may initially remain on the projecting mandrel 9 and are then pushed down from the mandrel using an ejector (not shown) and into receiving openings 10, which are provided in the removal unit 6. The removal unit is moved for this purpose between the open mold parts into an exact position in which their receiving openings and the mandrels of the multi-cavity mold are brought exactly into congruence. Then the ejector is actuated to push the pipette tips 2 off the mandrels 9 in the direction of the receiving openings 10 of the removal unit 6. The ejector stroke is of such magnitude that in each case the free end of the pipette tip can be moved somewhat into the receiving opening with one ejection stroke. Acceptance of the pipette tips is assisted by providing the removal unit 6 with a suction air device (not shown). The suction air device is connected with the receiving openings 10 and may, if need be, generate in the receiving openings 10 a negative pressure relative to the ambient pressure, to attach the pipette tips 2 by suction and hold them firm.

When the removal unit 6 is loaded with the pipette tips 2, it retains its vertical orientation and is moved out of the region of the injection molding machine 3. In the present exemplary embodiment, a linear guide 11 and a linear motor 12 are provided for moving out the removal unit. The removal unit 6 can thus not only be moved in a precisely positioned manner into the multi-cavity mold 4, but also moved out when loaded and conveyed to a transfer unit. At the same time, the removal unit 6 continues to retain its vertical orientation.

The object of the transfer unit 13 illustrated in FIGS. 2 and 3 is to accept the array of pipette tips 2 in vertical orientation from the removal unit 6 and then transfer it into a first grouping unit 14.

To this end, the transfer unit 13 is provided with transfer mandrels 15 for each pipette tip 2. The transfer mandrel fits in each case into the opening in the pipette tip. Furthermore, a movement device is assigned to move the transfer mandrels 15 into the openings in the pipette tips 2. With the pipette tips situated thereon, the transfer mandrels 15 are moved in the opposite direction fully out of the receiving openings 10 of the removal unit. So that the pipette tips 2 are firmly held on the transfer mandrels, the latter are connected to a suction air device (not shown). If need be, the suction air device generates a negative pressure relative to ambient pressure. The negative pressure sucks the pipette tip onto the transfer mandrel 15 and holds it firmly thereon.

The array of pipette tips 2 is then rotated out of their vertical orientation into a horizontal orientation. Each transfer mandrel 15 is then oriented suspended vertically downward and the pipette tips 2 are firmly held suspended on the transfer mandrels 15 using the connected suction air device, which generates an appropriate negative pressure.

Below the horizontally oriented array of pipette tips is located the stated first grouping unit 14, which has eight support strips 16 next to one another, wherein in each support strip a row of eight receiving openings 17 is provided for pipette tips 2. In this case, the receiving openings 17 of all the support strips are arranged congruently with the horizontally oriented array of pipette tips 2 still located in the transfer unit. In order to transfer the pipette tips into the receiving openings 17 of the support strips 16 of the first grouping unit 14, the suction air device is switched off. Either the pipette tips fall down and into the receiving openings 17 or the transfer unit 13 is lowered until the pipette tips project somewhat into the receiving openings 17, the suction air device then being switched off and the pipette tips being received securely in the receiving openings 17.

The first grouping unit 14 receives pipette tips only when they are already present in a row arrangement with an identical number of pipette tips per row, as in the exemplary embodiment in FIGS. 1-3, which all provide a grid arrangement or array with 8 rows with 8 pipette tips per row.

If, on the other hand, the multi-cavity mold has radial runner systems with mold cavities in a 6-sided, 8-sided, 10-sided or 12-sided polygonal arrangement, then this arrangement must firstly be changed into a two-row arrangement with 2 rows each with 3 pipette tips (2×3) or 2×4, 2×5 or 2×6 pipette tips. To this end, a further developed transfer unit is proposed further below with reference to FIGS. 15 and 16.

The first grouping unit 14 is shown separately in FIG. 4. Here, the eight support strips 16 are again visible, arranged parallel to one another. Each support strip 16 contains one row with eight receiving openings 17, which are in each case arranged at identical positions in the support strip 16 and with identical spacings within the row. In FIG. 4, the receiving openings 17 are each loaded with a pipette tip 2. Each pipette tip 2 rests in the receiving opening. It may be held upright in the receiving opening 17 or a circumferential shoulder or a conical circumferential region of the pipette tip 2 is held at the edge of the receiving opening 17.

Each support strip 16 of the first grouping unit 14 is mounted in each case by way of a pair of guide rails 18 and on the guide rails a pair of guide carriages 19 is arranged. The ends of the support strip are connected with the respective guide carriage 19. In the present exemplary embodiment, overall three pairs of guide rails 18, 20 and 21 are provided, although in principle one pair could suffice for all the support strips. In the present case, however, this would disadvantageously lead to the support strips 16 not being able to be moved as close together as desired. The reason for this lies in the size of the available guide carriages 19. If the guide carriages of all the support strips were to run on just one guide rail, then the size of the guide carriages 19 would specify how close the support strips 16 could be pushed together. Since the support strips are narrow, excessively large gaps would arise between the individual support strips. This is remedied by providing the stated three pairs of guide rails 18, 20 and 21, which allows the outer, longer support strips to be provided with cutouts for the guide carriages 19 of the adjacent inner support strips. In this way, it is ensured that the guide carriages of the inner support strips have space and can pass through the cutout in the longer support strips. In this manner, all the support strips 16 can be moved really close together.

As is clear from looking at FIGS. 4 and 5 together, the support strips 16 are movable transversely of their longitudinal extent and provision is made to move the eight support strips symmetrically relative to a midline C. In each case, four support strips are moved on the one symmetrical side and the other four support strips are moved on the opposing symmetrical side. The support strips may be moved apart from one another, as is shown in FIG. 4 and denoted "spread-out state". To adjust the exact end position for each support strip 16 in the spread-out state, in each case one outer limit stop 22 is provided, which limits the movement.

In FIG. 5, the grouping unit 14 is shown with its support strips 16 in the closed state. All the support strips have been moved close together. This brings about a compact arrangement of the pipette tips 2 in a first direction. The exact position of each support strip 16 in the depicted closed state is in turn adjusted or specified by way of a respective limit stop. In the present example, the limit stops for all the support strips are combined for the closed state and configured as a limit stop element 23 provided with pairs of steps.

Movement of the support strips 16 is driven in a particular way, as is described further below with reference to FIGS. 10 to 13.

Firstly, however, the next method step is explained with which the pipette tips 2 are likewise compactly arranged in a second direction. For this purpose, the handling system 1 is provided with a second grouping unit 24, which is depicted in FIG. 6 together with the first grouping unit 14. The second grouping unit 24 is located above the first grouping unit, because it is intended to receive the pipette tips 2, which are still located in the first grouping unit, therefrom.

To this end, the second grouping unit 24 in turn also has eight support strips 25, which are mounted movably on pairs of guide rails. Here too, three pairs of guide rails 26, 27 and 28 are provided. The principle of operation of the second grouping unit 24 is largely identical to the principle of operation of the first grouping unit 14. There is a difference in that, in the first grouping unit 14, the pipette tips 2 are arranged within receiving openings of the support strips, while the second grouping unit 24 is set up so to speak to lift the pipette tips 2 in each case using a downwardly projecting receiving element 29 which extends into the opening of the pipette tip 2. The support strips 25 of the second grouping unit 24 are to this end arranged suspended on the associated pair of two guide rails, as can best be seen from FIG. 7. When the suspended support strips 25 are in the spread-out state, outer limit stops 30 are provided, which exactly define the position of the support strips 25. Moreover, the suspended support strips 25 are visible, with said downwardly projecting receiving elements 29, which in each case engage in the opening of the pipette tip 2.

The suspended support strips 25 of the second grouping unit 24 are arranged in the handling system offset by 90° relative to the support strips of the first grouping unit 14. The grid arrangement of 8×8 pipette tips, already moved together compactly with the first grouping unit in one direction, is moved together compactly with the suspended support strips 25 in the second direction, as shown in FIG. 8. For this closed state of the suspended support strips 25, inner limit stops are also provided, which are likewise configured as an integral limit stop element 31. In this way, the precise end position of each support strip 25 is defined therefor.

The 8×8 pipette tips moved together compactly in two directions are then delivered by the second grouping unit 24 into a finished part holder, as shown in FIG. 9. The finished part holder has further empty receiving spaces for pipette tips, such that further grid arrangements each of 8×8 pipette tips can be placed on the finished part holder with the handling system.

How the movement of the support strips of the two grouping units is driven is described below with reference to FIGS. 10 to 13. By way of example, the functionality of the drive is explained with reference to the second grouping unit, which has suspended support strips. FIG. 10 shows a portion of the second grouping unit 24. The support strips 25 thereof are subdivided into two symmetrical sides, each with four of the support strips 25. An integral limit stop element 31 is provided for the closed state of the support strips and outer stops 30 are provided for the spread-out state. The outer limit stops 30 and the inner limit stop element 31 function in the same way as those explained with reference to FIGS. 4 and 5.

FIG. 10 shows one symmetrical side of the second grouping unit, and reveals a pusher element 32, which is driven translationally by a pneumatic cylinder P1. The other symmetrical side is constructed as a mirror image, the pusher element used and the pneumatic cylinder being identical.

FIG. 11 shows just the pusher element 32, which is set up in such a way that its movement can be transmitted to all four support strips 25 of the one symmetrical side. This takes account of the fact that all the support strips 25 have to be moved by different amounts. If the support strips 25 are moved to and fro between the spread-out and the closed states, then the inner support strip, which is closest to the midline C, has to travel the shortest distance and the outlying support strip, which is furthest from the midline C, has to travel the longest distance.

When the support strips 25 move apart from the closed state into the spread-out state, once the first, inner support strip has reached its limit/end stop, the remaining three support strips 25 have to continue moving. Once the second support strip 25 has reached its end stop, the third and fourth support strips 25 have to continue moving, and as soon as the third support strip 25 reaches its limit/end stop, just the fourth support strip 25 continues moving on to its end stop.

To implement the above-described movement of the support strips mechanically, adjoining movement paths 33a, 34a, 35a are provided with individual movement end points for the support strips, specifically in the form of pusher face pairs 33, 34, 35 and 36 respectively.

The pusher faces of the pusher face pairs are in each case aligned facing one another and define the ends of the corresponding movement path. The movement paths are oriented parallel to the translational direction of movement of the pusher element 32.

A driver element 37, which interacts with the associated pusher face pairs of the pusher element 32, is arranged on each support strip 25. Depending on the direction of movement, the driver element 37 is pushed by one or the other pusher face in the corresponding direction.

For the outlying support strip 25, which has to travel the furthest distance between the spread-out and closed states, the pusher face pair is configured as a hole 36a in the pusher element 32. The two pusher faces lie close to one another in the hole. This is the case because the maximum stroke of the pusher element 32 corresponds to the distance by which the outlying support strip 25 has to be moved between the spread-out and the closed states.

Figure 12:
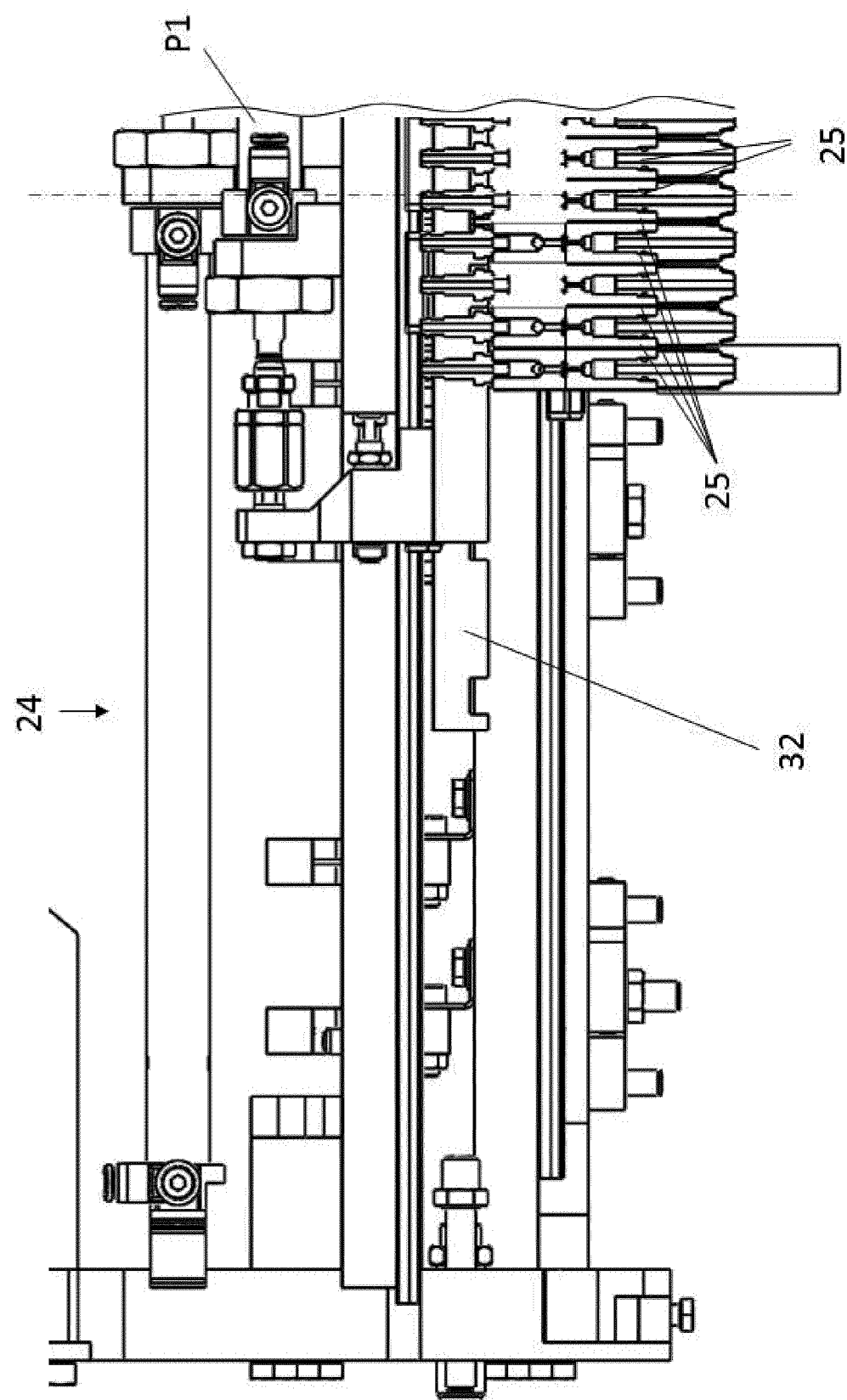

FIG. 12 shows the closed state of the four support strips 25. The inner one of the four support strips 25 lies against the midline C and the others are arranged compactly against one another.

If more than four support strips are provided per symmetrical side, these may be moved using a correspondingly adapted pusher element, which has additional pusher face pairs for each additional support strip.

FIG. 13 shows the support strips 25 of both symmetrical sides in the closed state and the position of the midline C. The respectively inner support strip 25 has been moved up to the midline C and the other support strips lie compactly next to one another. FIG. 13 shows the driver elements 37. Each driver element 37 is held in a hole 38 in the support strip 25, and has a driver foot 37a, which sits in the hole 38 and a driver head 37b, which projects from the support strip. The driver foot 37a is of yielding construction, so as to have an elastically resilient action. When the driver head 37b comes into contact with one of the pusher faces of the pusher element, the elastically resilient action is accompanied by a degree of damping. It is moreover possible, in this way, to move the support strips to their end positions against the respective limit stops (30, 31) and bring about a distinct end position. Due to the yielding nature of the driver elements 37, high pressure against the limit stops (30, 31) is avoided and on the other hand it may be ensured that the support strip 25 does not stop moving before reaching the limit stop (30, 31), with the attendant risk of imprecise positioning.

FIGS. 14a to 14e are schematic representations of specific preferred removal assemblies, as may be specified by multi-cavity molds. Corresponding radial runner systems with mold cavities may specify such a removal assembly.

According to FIG. 14a, a removal assembly is shown which is based on two radial runner systems 39 and 40 each with four mold cavities. The removal assembly is shown in a vertical plane. Here, injection molded parts from the two radial runner systems lie next to one another. The positions of the four mold cavities or injection molded parts 41 of a radial runner system are indicated by small circles, which are uniformly distributed about a circumcircle 42. According to FIG. 14a, the injection molded parts 41 are arranged square relative to one another. Each two injection molded parts 41 lie symmetrically relative to a vertical midline C. The two injection molded parts to the left of the midline C lie on an outer line and form a row R1 and the two injection molded parts to the right of the midline C lie on an outer line and form a row R2. Since this removal assembly already has two rows and identical numbers of injection molded parts 41 per row, the removal assembly here allows injection molded parts to be delivered directly into the first grouping unit.

FIG. 14b shows a removal assembly which is likewise in a vertical plane, wherein this assembly is based on a radial runner system with six mold cavities or injection molded parts 43 which lie on a circumcircle 44. Each three injection molded parts 43 are arranged symmetrically relative to a vertical midline C. The midline C itself remains free of injection molded parts. The three mold cavities on one side of the midline C are not as yet arranged in a row. One injection molded part lies to the outside on the circumcircle and is at the greatest distance from midline C. The other two injection molded parts lie closer to the midline C. To produce a row arrangement, the two injection molded parts located closer to the midline C are pushed outward until they are in a vertical row R1 with the outlying injection molded part. The inner two injection molded parts to the right of the midline C are pushed into R2.

In order to be able to bring about the above-described two-row arrangement of injection molded parts, the transfer unit is further developed. To this end, the transfer unit is provided with a repositioning device, which can modify the position of specific injection molded parts. A correspondingly further developed transfer unit or the repositioning device thereof is explained further below with reference to FIGS. 15 and 16.

FIG. 14c shows a removal assembly, again in a vertical plane, wherein this assembly is based on a radial runner system with eight mold cavities or injection molded parts 45, which lie uniformly spaced on a circumcircle 46. According to the diagram of FIG. 14c, each four injection molded parts lie symmetrically relative to a vertical midline C. The midline C itself remains free of injection molded parts. The four injection molded parts on one side of the midline are not as yet arranged in a row. Two of the injection molded parts are already aligned to the outside in a row R1 and are at the greatest distance from the midline C. The other two injection molded parts lie closer to the midline C and are pushed outward until they are in the same row R1 as the other two outlying injection molded parts, so as to bring about a row arrangement. This happens in mirror image on the other side of the midline C. A grid arrangement of 2×4 injection molded parts in parallel rows is thus obtained, which may be delivered into the grouping unit.

FIG. 14d shows a further removal assembly, again in a vertical plane, wherein this assembly is based on a radial runner system with ten mold cavities or injection molded parts 47, which lie uniformly spaced on a circumcircle 48. Each five injection molded parts lie symmetrically relative to a vertical midline C. The midline C itself again remains free of injection molded parts. The five injection molded parts on one side of the midline C are not as yet arranged in a row. One injection molded part is at the greatest distance from the midline. There are four other injection molded parts, two of which are a short distance from the midline C and the other two of which are a medium distance from the midline C. To bring about a row arrangement, the injection molded parts at a short and medium distance from the midline are all pushed outwards until they are in one and the same vertical row R1 as the outlying injection molded part and correspondingly symmetrically in one and the same vertical row R2. This results in a grid arrangement of 2×5 injection molded parts in parallel rows, which may be delivered into the grouping unit.

FIG. 14e shows a further removal assembly, likewise in a vertical plane, wherein this assembly is based on a radial runner system with twelve mold cavities or injection molded parts 49, which lie uniformly spaced on a circumcircle 50. Each six injection molded parts lie symmetrically relative to a vertical midline. The midline itself again remains free of injection molded parts. The six injection molded parts on one side of the midline C are not as yet arranged in a row. Two outlying injection molded parts are at the greatest distance from midline C and are already located aligned on a line parallel to the midline. There are four other injection molded parts, two of which are a short distance from the midline C and the other two of which are a medium distance from the midline C. To bring about a row arrangement, the injection molded parts at a short and medium distance from the midline are all pushed outward until they are in one and the same vertical row R1 or respectively one and the same vertical row R2 as the two outlying injection molded parts. This results in a grid arrangement of 2×6 injection molded parts in parallel rows, which may be delivered into the grouping unit.

FIG. 15 clarifies how a further-developed transfer unit is configured. This further-development is needed when the multi-cavity mold, which specifies the removal assembly, has a number of 6 injection molded parts per radial runner system, distributed around a circumcircle, or a number of 8, 10 or 12 injection molded parts distributed around a circumcircle. In these cases, the injection molded parts arrive in the transfer unit without as yet any two-row arrangement with identical numbers of injection molded parts per row. Arrangement in rows with identical numbers of injection molded parts per row is, however, a prerequisite to be able to transfer the injection molded parts into the first grouping unit.

The transfer unit proposed above is therefore further developed and specifically provided with a specific repositioning device 51, which may change the spatial arrangement of the injection molded parts in order to bring them into a two-row arrangement. The present further developed transfer device is based on a removal assembly, which corresponds in principle to the example of FIG. 14c, because it can in each case accommodate eight injection molded parts uniformly spaced around a circumcircle 52. In FIG. 15, eight projecting receiving elements 53 are provided for each of the eight injection molded parts originating from one radial runner system. The repositioning device 51 can handle injection molded parts from a total of eight radial runner systems. In the transfer unit, the spatial arrangement of the eight radial runner systems is mapped in two rows, an upper row L1 and a lower row L2 each with four radial runner systems.

A vertical midline C runs in each case through a radial runner system of the upper row L1 and a radial runner system of the lower row L2. Each radial runner system has four receiving elements 53 for injection molded parts provided in each case to the left of the midline C and likewise four receiving elements 53 for injection molded parts to the right of the midline C.

The repositioning device has a base element 54. The receiving elements 53 for those injection molded parts which do not have to be shifted, namely the outlying receiving elements 53 located in rows R1 and R2, are arranged stationarily on the base element.

Furthermore, the other four receiving elements of the repositioning device are mobile, namely those which, according to FIG. 15, are located closer to the midline C.

To obtain the mobile receiving elements of the repositioning device, pusher rods 55, 56, 57, 58, 59, 60, 61 and 62 are provided, which are capable of pushing the mobile receiving elements. Those mobile receiving elements which are identically aligned and have to be moved in the same direction interact with the same pusher rod. This applies, for example, to the mobile receiving elements 59, 60, 61 and 62 in row L2, which interact with the pusher rod 61 and have to be moved in the direction of arrow M. However, mobile receiving elements 67, 68, 69 and 70 identically aligned in row L2 are also present which have to be moved in the opposite direction, that of arrow N, and for this purpose are connected with pusher rod 62, which is moved in the direction of arrow N.

For the pusher rods 56, 58, 60 and 62, coupling is provided via a coupling element 71 which connects these pusher rods together and moves them in the same direction. One receiving element, with the same direction of movement, from each radial runner system is connected to each of these pusher rods. A pneumatic cylinder 72 is provided on the coupling element 71 for joint drive of the pusher rods 56, 58, 60 and 62.

The other pusher rods 55, 57, 59 and 61 are likewise connected together via a coupling element 73 for the purpose of being jointly driven. A piston rod 74 of the pneumatic cylinder 72 is connected to the coupling element 73. For correct positioning of the receiving elements which are movable to and fro, limit stop elements are provided on the pusher rods, such as for example limit stop element 75 on pusher rod 56. One limit stop element is sufficient per pusher rod for each direction of movement. The limit stop element then interacts with one of the receiving elements of these pusher rods. None of the other receiving elements needs its own limit stop elements.

FIG. 16 shows the final state, in which all the mobile receiving elements have been moved outward relative to the midline, such that now the limit stop element 75 has come into contact with the nearest receiving element of the pusher rod 56, thereby limiting movement in this direction. Furthermore, in FIG. 16, a second limit stop element 76 is provided on the pusher rod 56, which limits movement in the opposite direction. In the present exemplary embodiment, the limit stop element 76 interacts with two receiving elements, which move symmetrically toward one another and stop on both sides, when they come into contact with the limit stop element 76.

In FIG. 15, the two receiving elements are in contact with the stated limit stop element 76; however, the perspective of FIG. 15 means that the limit stop element is concealed. The mobile receiving elements are then situated in one row R1 or R2 with the two outer stationary receptacles. In this way, a total of 8×8 injection molded parts have been repositioned from a virtually circular arrangement into a grid arrangement with parallel rows. As a result, eight vertical rows are formed, each row of which comprises four receiving elements. With this grid arrangement, a total of 64 injection molded parts may be delivered by the transfer unit into the first grouping unit.

LIST OF REFERENCE SIGNS

1 Handling system
2 Pipette tip
3 Injection molding machine
4 Multi-cavity mold
4a Mold part (stationary)
4b Mold part (mobile)
5 Finished part holder
6 Removal unit
7 Circumcircle
8 Circumcircle
9 Mandrel
10 Receiving opening (removal unit)
11 Linear guide
12 Linear motor
13 Transfer unit
14 First grouping unit
15 Transfer mandrel
16 Support strip
17 Receiving opening (support strip)
18 Guide rail (pair)
19 Guide carriage (pair)
20 Guide rail (pair)
21 Guide rail (pair)
22 Outer limit stop
23 Limit stop element
24 Second grouping unit
25 Support strip
26 Guide rail
27 Guide rail
28 Guide rail
29 Receiving element
30 Outer limit stop
31 Limit stop element
32 Pusher element
33 Pusher face pair
33a Movement path
34 Pusher face pair
34a Movement path
35 Pusher face pair
35a Movement path
36 Pusher face pair
36a Hole
37 Driver element
37a Driver foot
37b Driver head
38 Hole (support strip)
39 Radial runner system
40 Radial runner system
41 Injection molded part
42 Circumcircle
43 Injection molded part
44 Circumcircle
45 Injection molded part
46 Circumcircle
47 Injection molded part
48 Circumcircle
49 Injection molded part
50 Circumcircle
51 Repositioning device
52 Circumcircle
53 Receiving element
54 Base element
55 Pusher rod
56 Pusher rod
57 Pusher rod
58 Pusher rod
59 Pusher rod
60 Pusher rod
61 Pusher rod
62 Pusher rod
63 Receiving element
64 Receiving element
65 Receiving element
66 Receiving element
67 Receiving element
68 Receiving element
69 Receiving element
70 Receiving element
71 Coupling element
72 Pneumatic cylinder
73 Coupling element
74 Piston rod
75 Limit stop element
76 Limit stop element
C Midline
L1 Row
L2 Row
M Arrow
N Arrow
P1 Pneumatic cylinder
R1 Row
R2 Row S1 Mobile receiving element
S2 Mobile receiving element
S3 Mobile receiving element
S4 Mobile receiving element P1

The invention claimed is:

1. A method for handling individual parts which have to be removed from a preceding production process, in particular injection molded parts in the form of pipette tips (2), which are produced in large numbers in an injection molding machine (3) using a multi-cavity mold (4) and have to be removed from the multi-cavity mold (4) for further handling, wherein the multi-cavity mold (4) has at least one radial runner system with a plurality of mold cavities, whereby a removal assembly is provided by the multi-cavity mold (4) for further handling of injection molded parts, the method comprising:
   a) removing the finished injection molded parts from all existing mold cavities of the multi-cavity mold (4) at once in a single method step and delivered to a transfer unit (13), which, in the subsequent course of the method, transfers the injection molded parts into a first grouping unit (14),
   b) loading the injection molded parts into the first grouping unit (14) in the form of a two-dimensional grid, wherein the grid has at least two rows each with two injection molded parts,
   c) when loaded, moving with the first grouping unit (14) the injection molded parts of parallel mutually adjacent rows (R1, R2) toward one another, so as to produce a more compact grid arrangement of the injection molded parts in a first coordinate direction,
   d) then removing the injection molded parts from the first grouping unit (14) with a second grouping unit (24), wherein the distance between the rows in the second coordinate direction is likewise reduced using the second grouping unit (24), so as to produce a more compact, tighter grid in both coordinate directions.

2. The method according to claim 1, wherein the removal assembly specified by the multi-cavity mold (4) for the injection molded parts has a regular convex polygon with an even number (n) of vertices on a circumcircle (7, 8, 42, 44, 46, 48, 50, 52), wherein the injection molded parts lie at the vertices of the polygon with a midline C that divides the number of injection molded parts symmetrically and in the case of a number greater than four vertices/injection molded parts the following intermediate step is performed between method steps a) and b):
   $a_1$) moving innermost injection molded parts relative to the midline (C) are moved outward until they are aligned in the same line with the outlying injection molded parts, such that two parallel rows (R1, R2) are formed from all (n) injection molded parts.

3. The method according to claim 2, wherein the midline (C) is defined in the first grouping unit (14) and/or in the second grouping unit (24), which midline lies symmetrically between the parallel adjacent rows of injection molded parts, and in that the adjacent rows of injection molded parts are moved symmetrically toward the midline (C).

* * * * *